(12) United States Patent
Omori et al.

(10) Patent No.: US 7,957,245 B2
(45) Date of Patent: Jun. 7, 2011

(54) RECORDING MEDIUM, RECORDING METHOD, AND COMPUTER PROGRAM

(75) Inventors: Kyusho Omori, Saitama (JP); Masahiro Kato, Saitama (JP); Eisaku Kawano, Saitama (JP); Masahiro Miura, Saitama (JP); Tohru Kanegae, Saitama (JP)

(73) Assignee: Pioneer Corporation, Tokyo (JP)

( * ) Notice: Subject to any disclaimer, the term of this patent is extended or adjusted under 35 U.S.C. 154(b) by 887 days.

(21) Appl. No.: 11/795,207

(22) PCT Filed: Jan. 13, 2006

(86) PCT No.: PCT/JP2006/000370
§ 371 (c)(1),
(2), (4) Date: Sep. 11, 2007

(87) PCT Pub. No.: WO2006/075700
PCT Pub. Date: Jul. 20, 2006

(65) Prior Publication Data
US 2008/0137509 A1     Jun. 12, 2008

(30) Foreign Application Priority Data
Jan. 14, 2005   (JP) ................................ 2005-008445

(51) Int. Cl.
*G11B 7/00*   (2006.01)
(52) U.S. Cl. ..................... 369/59.25; 369/275.3; 369/94
(58) Field of Classification Search ................. 369/47.5, 369/47.51, 47.53, 53.26, 94, 275.3, 59.25, 369/283
See application file for complete search history.

(56) References Cited

U.S. PATENT DOCUMENTS

| | | | |
|---|---|---|---|
| 5,881,032 A | 3/1999 | Ito et al. | |
| 2002/0186637 A1 | 12/2002 | Van Woudenberg et al. | |
| 2003/0123379 A1* | 7/2003 | Thompson et al. | 369/275.4 |
| 2004/0264322 A1* | 12/2004 | Shishido et al. | 369/47.22 |
| 2005/0013222 A1* | 1/2005 | Lee et al. | 369/47.51 |
| 2005/0025013 A1* | 2/2005 | Yamamoto | 369/47.53 |
| 2005/0030874 A1* | 2/2005 | Sasaki | 369/94 |
| 2005/0226133 A1* | 10/2005 | Ueki | 369/275.3 |
| 2006/0153055 A1* | 7/2006 | Suh | 369/275.1 |

FOREIGN PATENT DOCUMENTS

EP   1 465 172   10/2004
(Continued)

OTHER PUBLICATIONS

ECMA: Standardizing Information and Communication Systems: "Standard ECMA-267: 120 mm DVD- Read-Only Disk" Standard ECMA-267, No. 272, Apr. 1, 2001, pp. 1-86, XP002258081.

(Continued)

*Primary Examiner* — Wayne R Young
*Assistant Examiner* — Thomas D Alunkal
(74) *Attorney, Agent, or Firm* — Young & Thompson

(57) ABSTRACT

A recording medium (100) is provided with: a first recording layer (L0) and a second recording layer (L1) to record therein record information, and a control area (102, 118) in said recording layer and a control area in said second recording layer to record therein control information for controlling at least one of recording and reproduction of the record information, wherein a distance between an inner radius of the control area in the first recording layer and an outer radius of the control area in the second recording layer is larger than or equal to a first predetermined value.

10 Claims, 11 Drawing Sheets

FOREIGN PATENT DOCUMENTS

| | | |
|---|---|---|
| JP | 11-312363 | 11/1999 |
| JP | 2000-503446 | 3/2000 |
| JP | 2000-311346 | 11/2000 |
| JP | 2001-23237 | 1/2001 |
| JP | 2004-519810 | 7/2004 |
| WO | 97/15050 | 4/1997 |
| WO | 02/075728 | 9/2002 |
| WO | 2005/004119 | 1/2005 |

OTHER PUBLICATIONS

European Patent Office issued an European Search Report dated Jun. 4, 2009, Application No. 06 71 1655.8.

* cited by examiner

[FIG. 1]
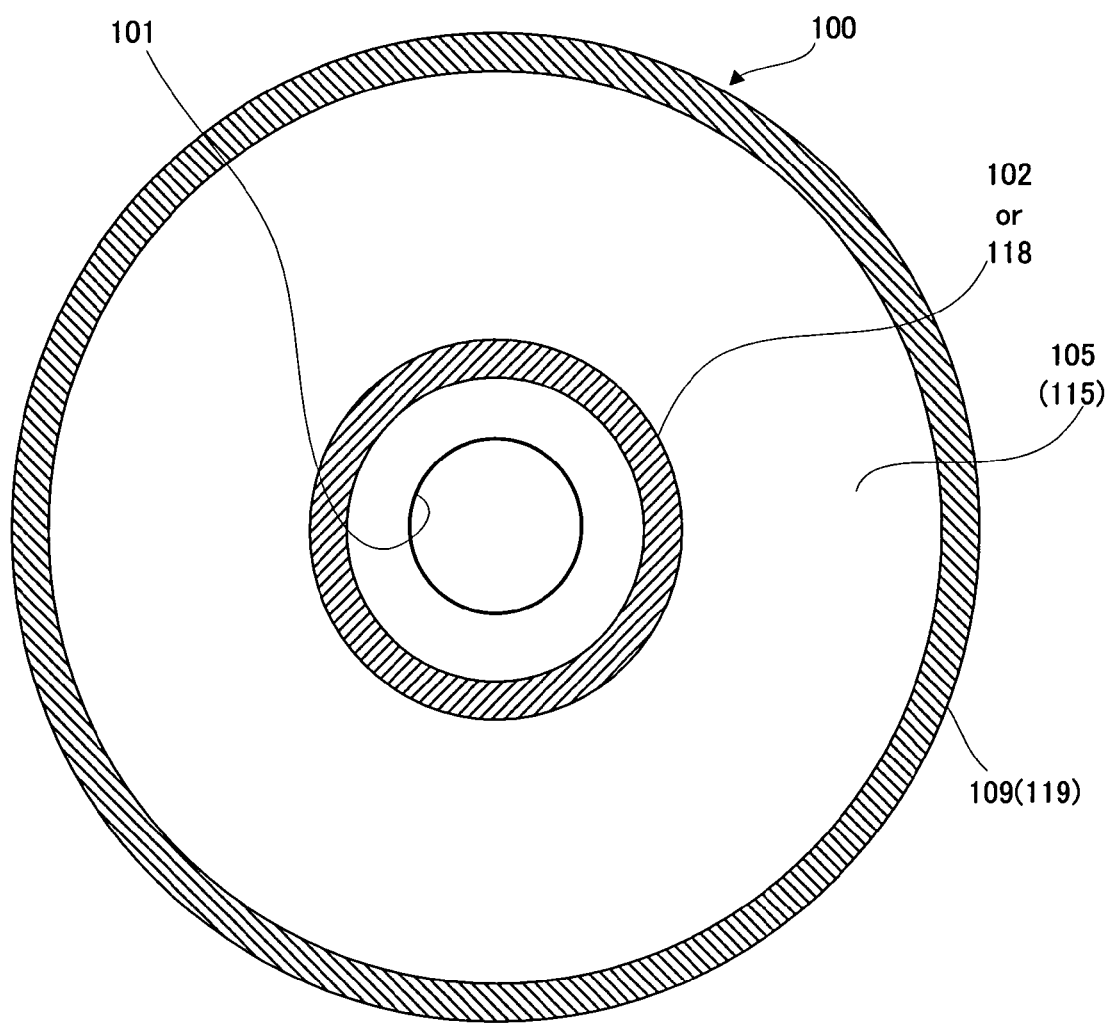

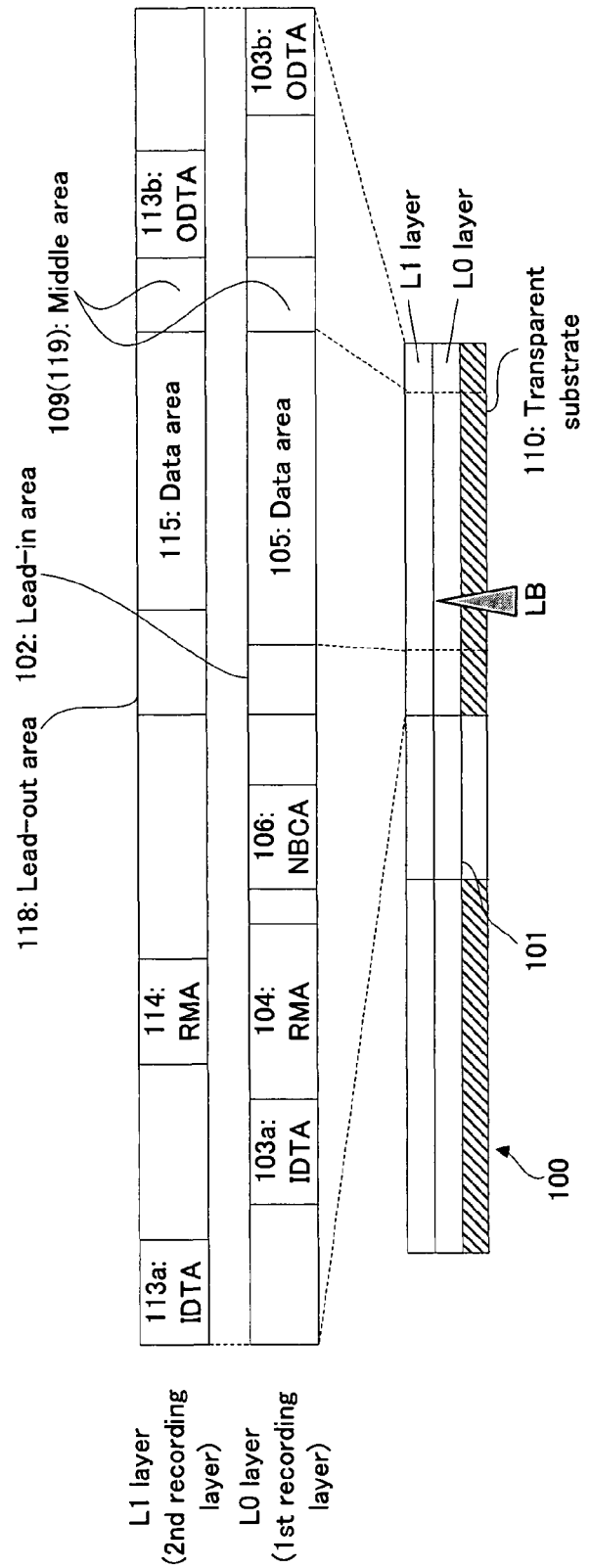
[FIG. 2]

[FIG. 3]
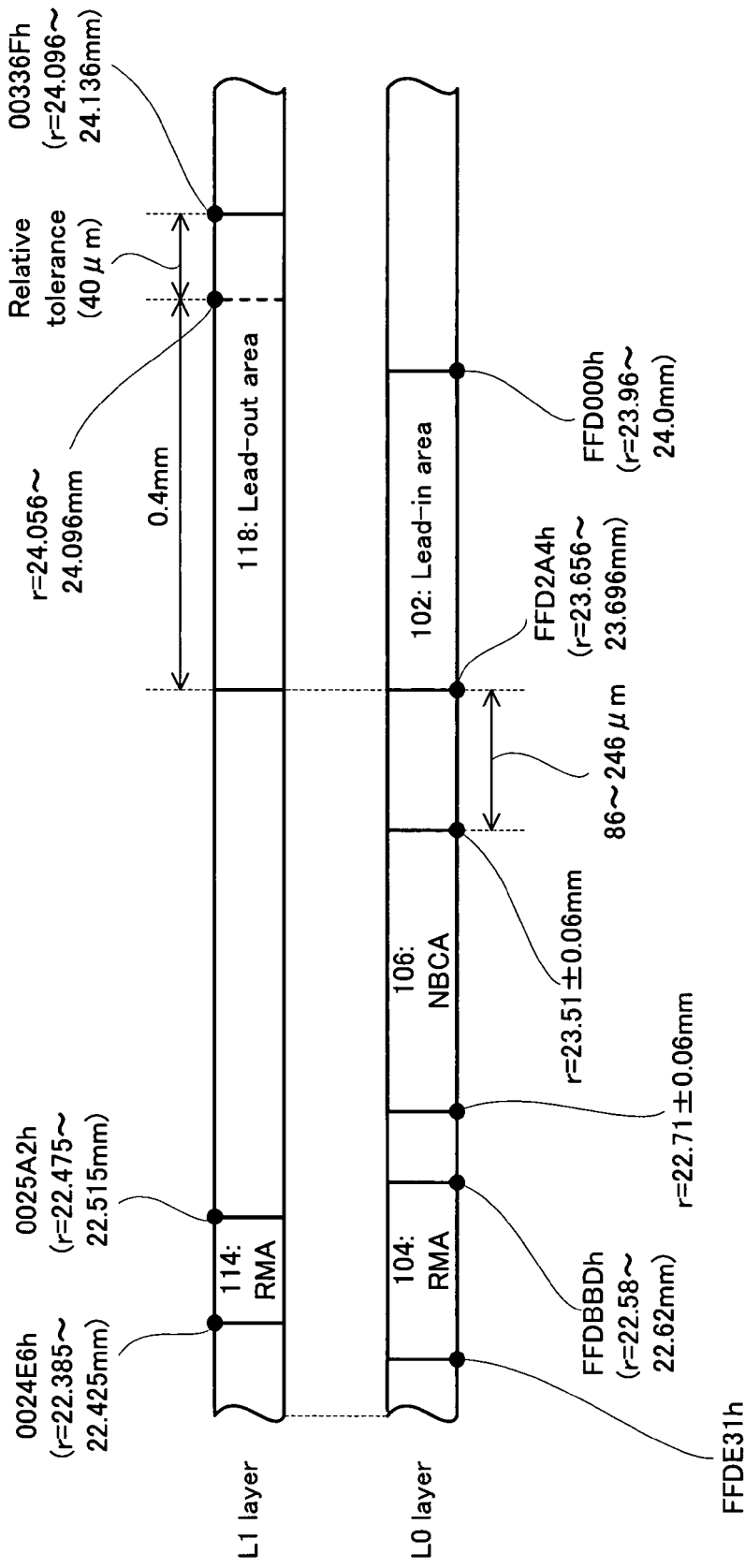

[FIG. 4]
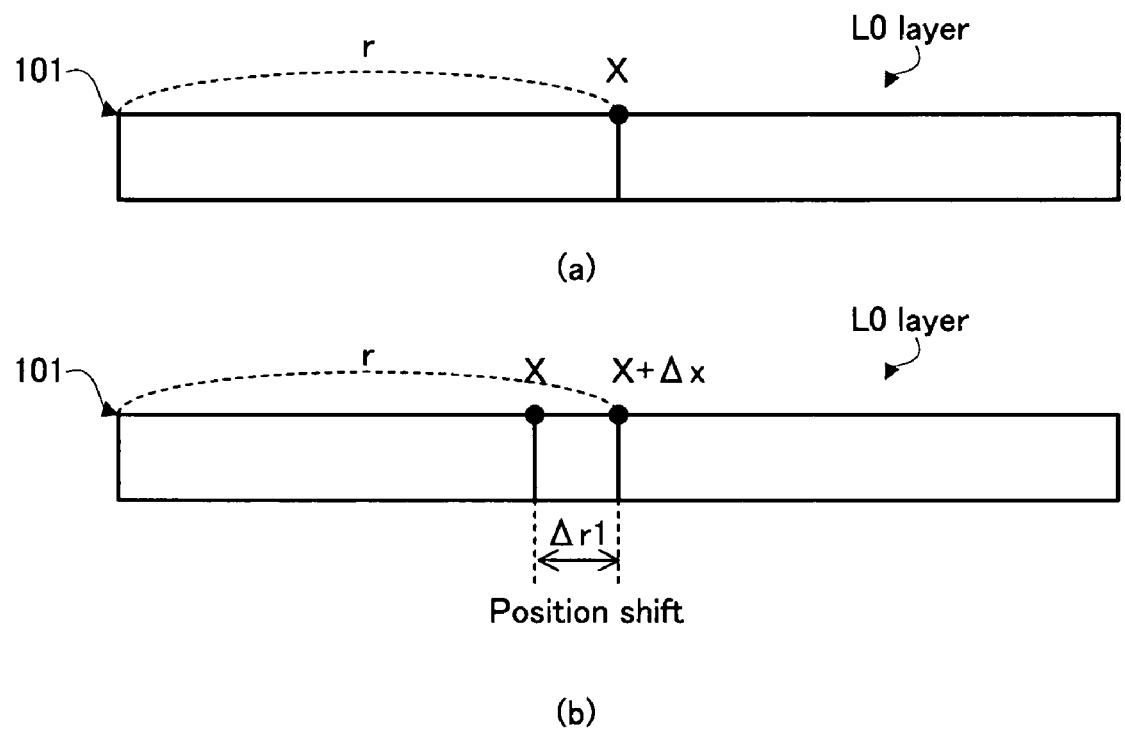

[FIG. 5]
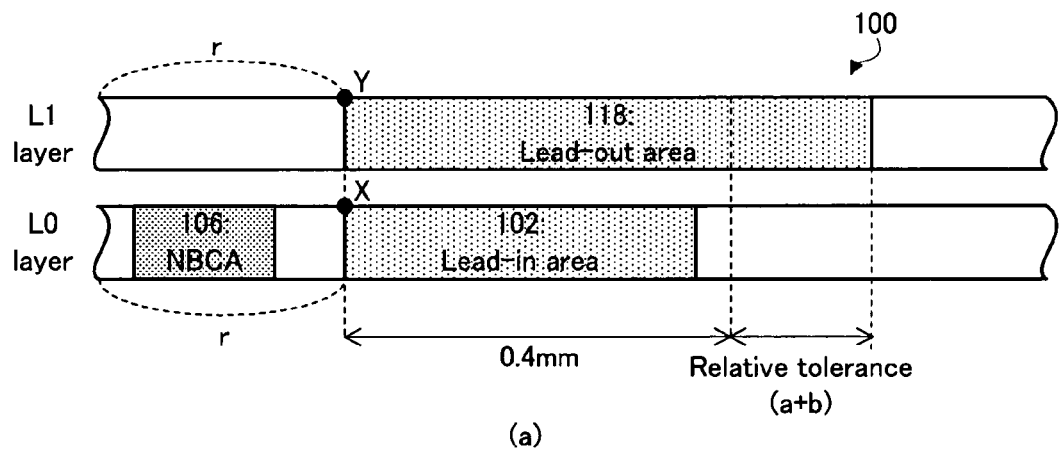
(a)
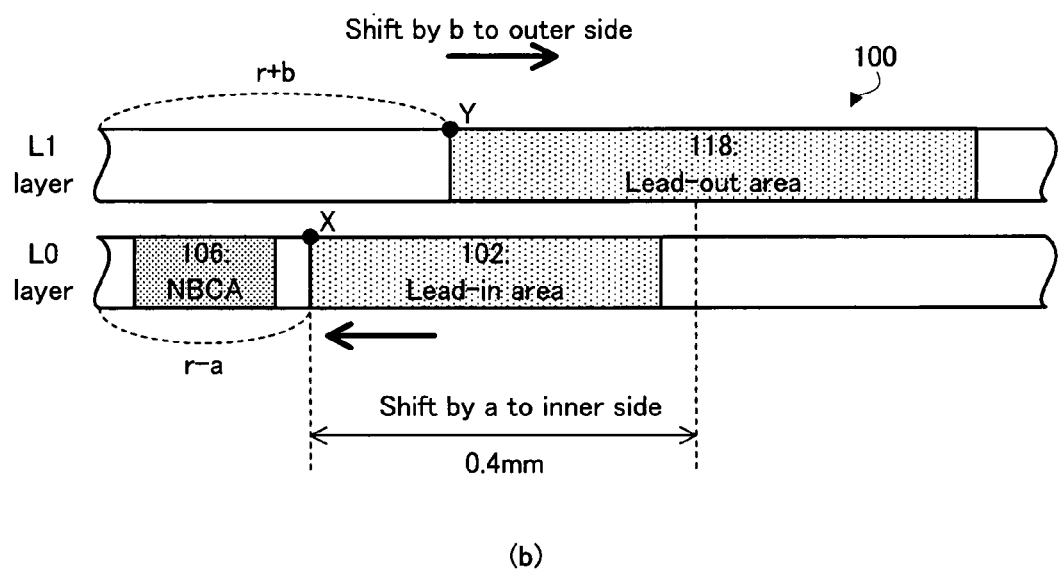
(b)
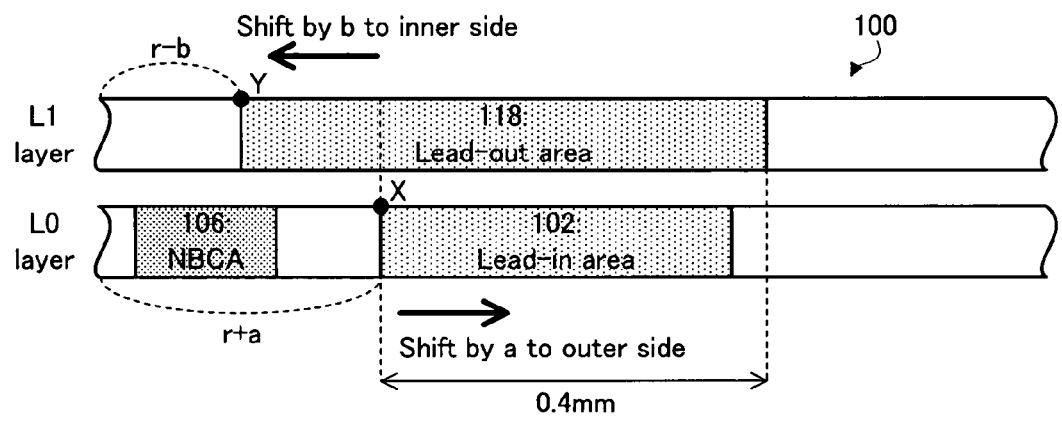
(c)

[FIG. 6]
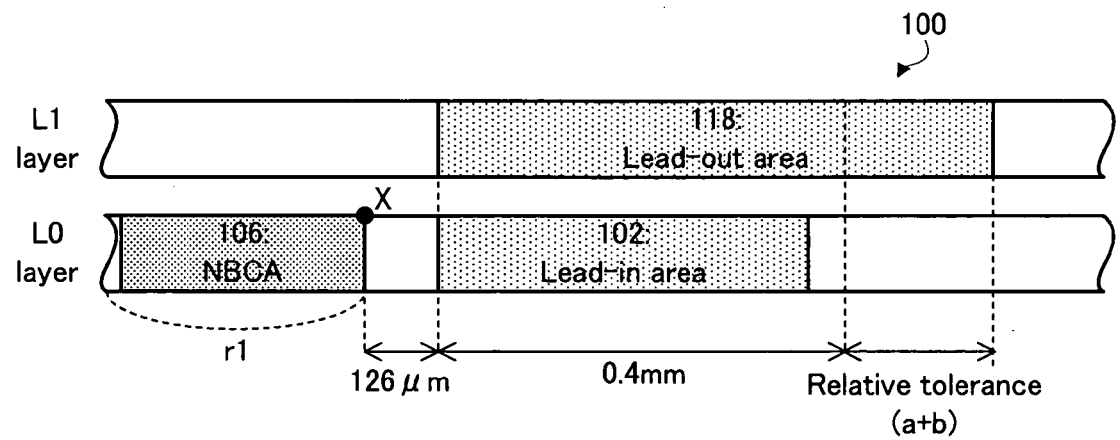
(a)
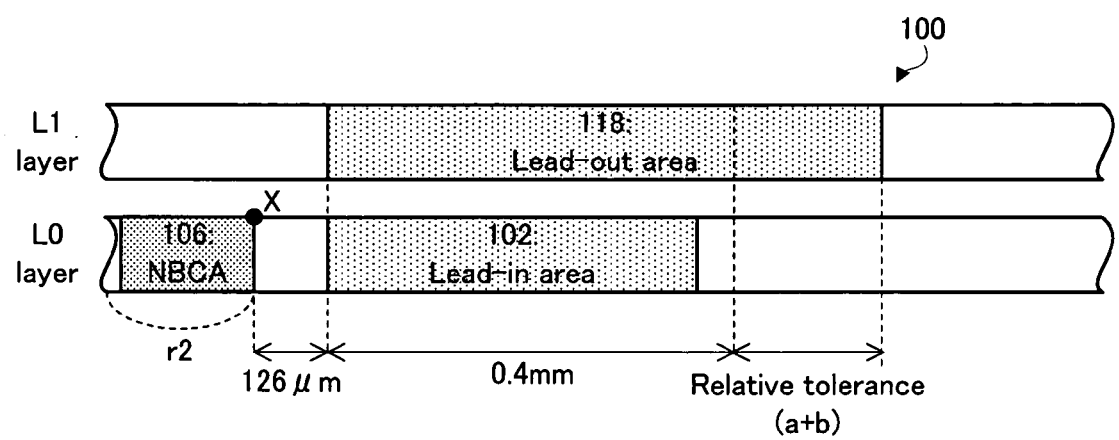
(b)

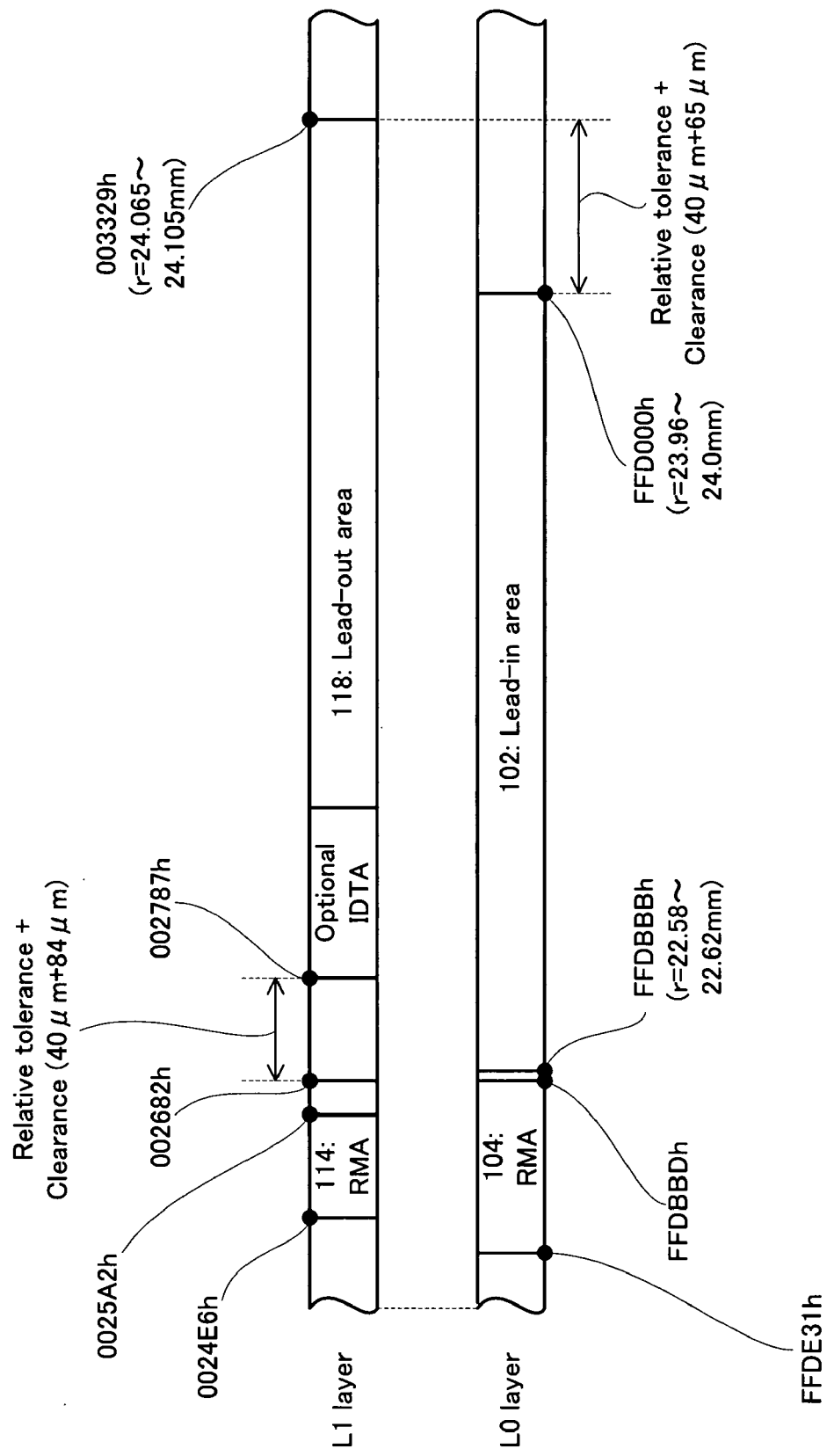
[FIG. 7]

[FIG. 8]
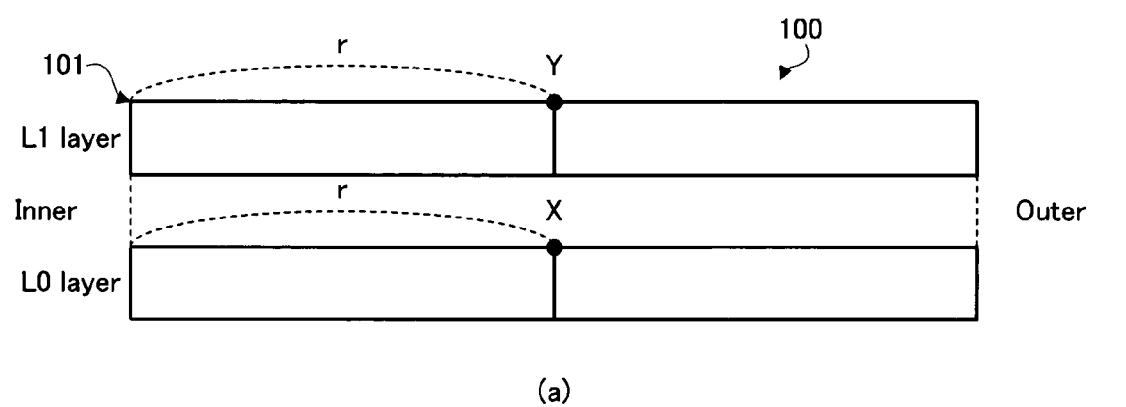
(a)
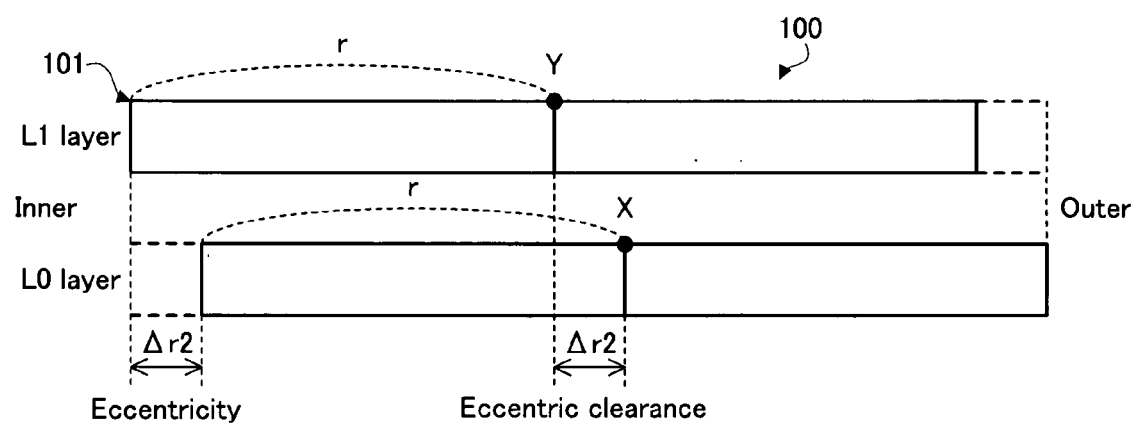
(b)

[FIG. 9]
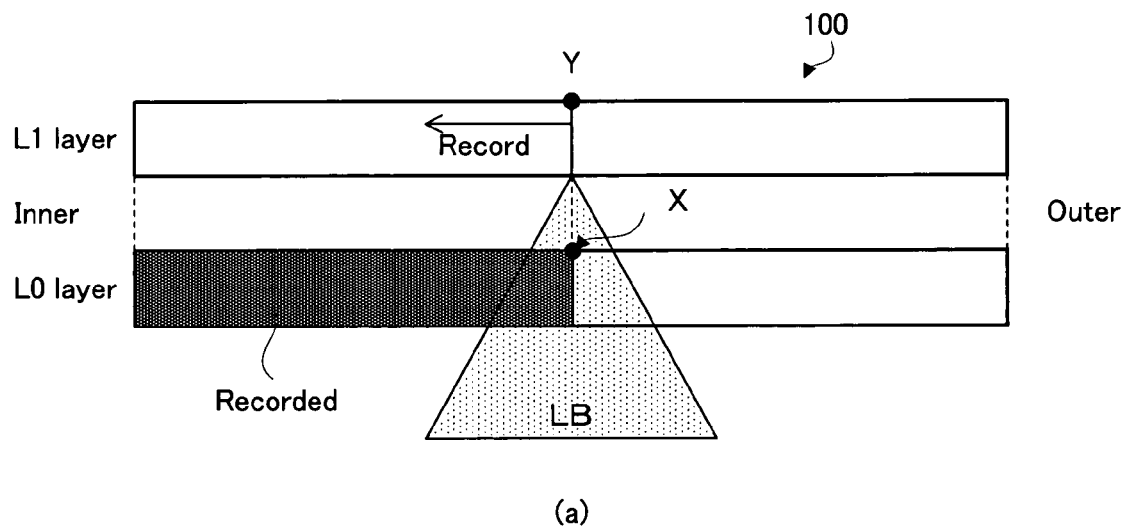
(a)
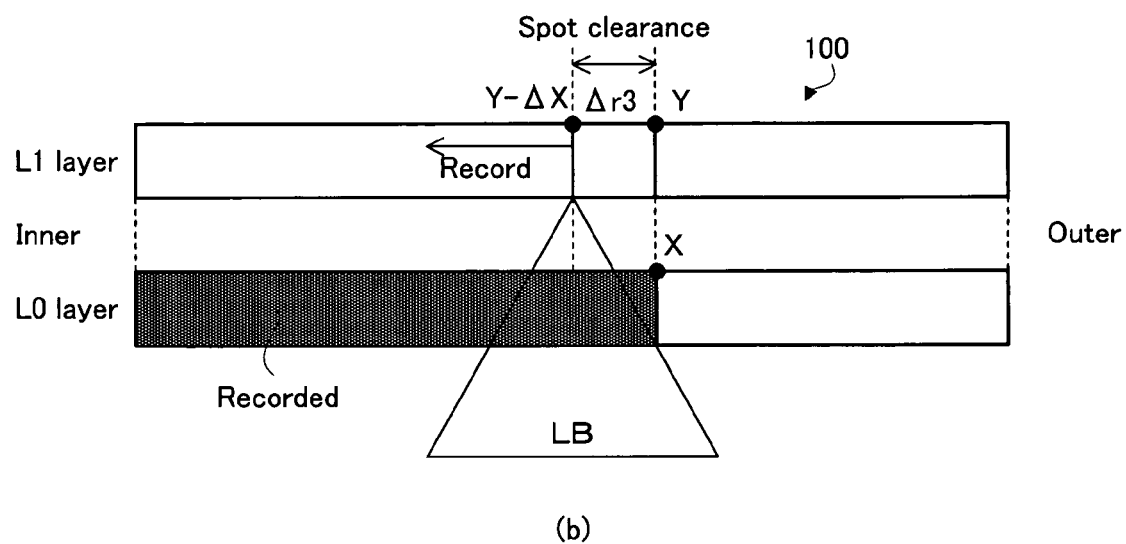
(b)

[FIG. 10]
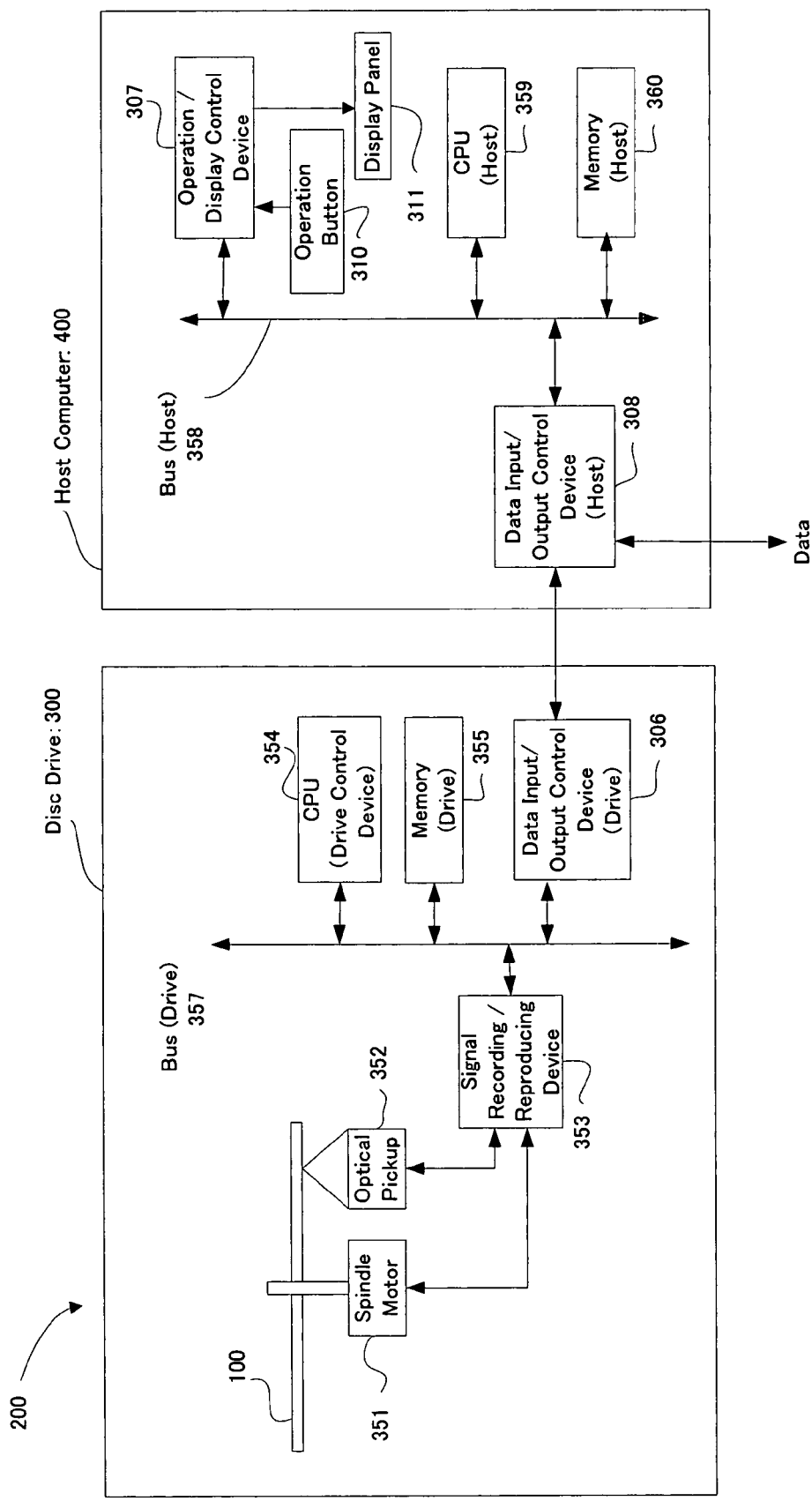

[FIG. 11]
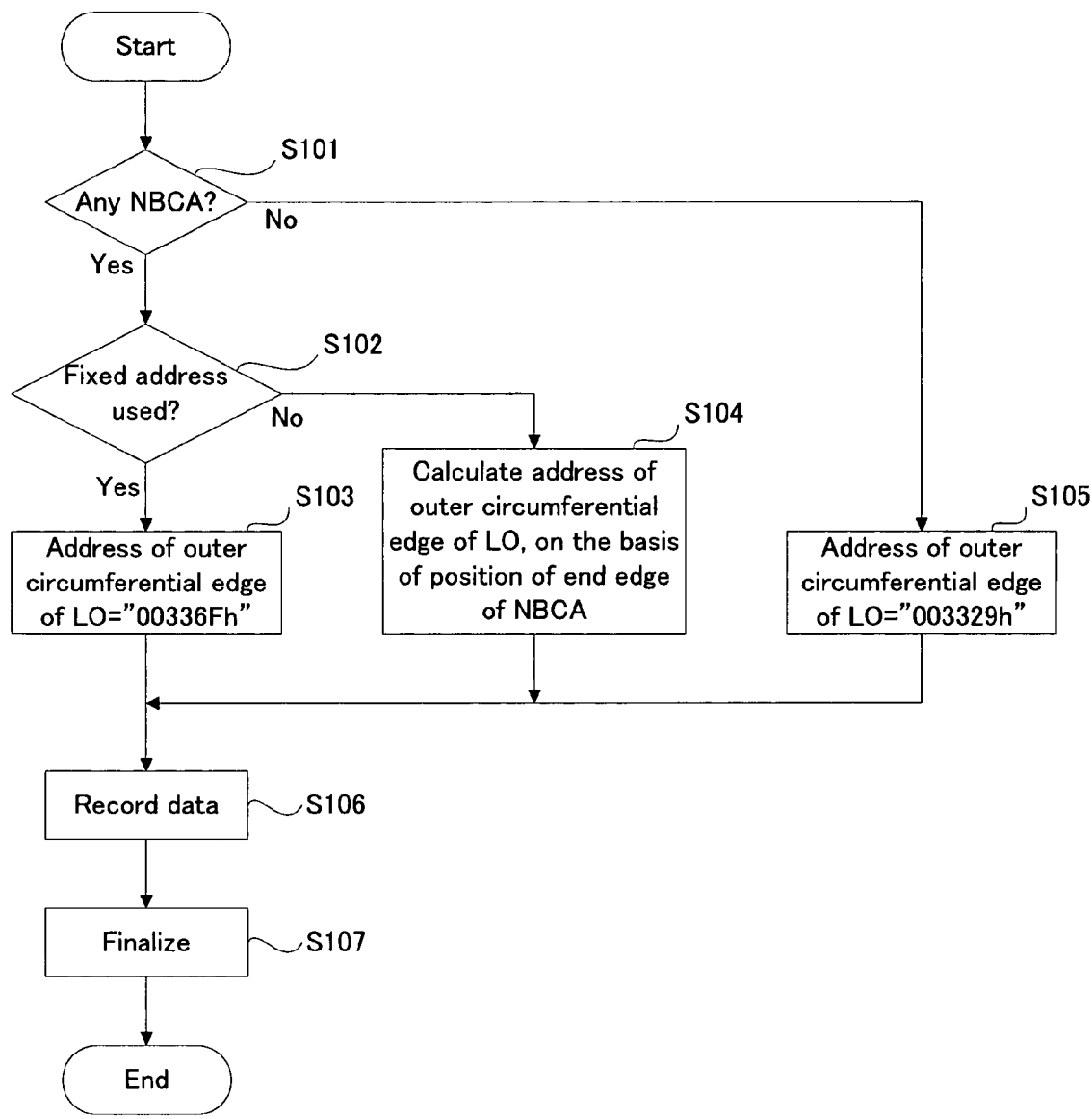

RECORDING MEDIUM, RECORDING METHOD, AND COMPUTER PROGRAM

TECHNICAL FIELD

The present invention relates to a recording medium, such as a DVD, a recording apparatus and method, such as a DVD recorder, and a computer program which makes a computer function as the recording apparatus.

BACKGROUND ART

In an information recording medium, such as a CD-ROM (Compact Disc-Read Only Memory), a CD-R (Compact Disc-Recordable), and a DVD-ROM, for example, as described in patent documents 1 and 2 or the like, there is also developed an information recording medium, such as a multi-layer type or dual-layer type optical disc, in which a plurality of recording layers are laminated or pasted on the same substrate. Then, on an information recording apparatus, such as a DVD recorder, for performing the recording with respect to the dual-layer type optical disc, laser light for recording is focused on a recording layer located on the front (i.e. on the closer side to an optical pickup) as viewed from the irradiation side of the laser light (hereinafter referred to as an "L0 layer", as occasion demands) to thereby record data into the L0 layer in an irreversible change recording method or a rewritable method by heat. Moreover, the laser light is focused or condensed on a recording layer located on the rear of the L0 layer (i.e. on the farther side from the optical pickup) as viewed from the irradiation side of the laser light (hereinafter referred to as an "L1 layer", as occasion demands), through the L0 layer or the like, to thereby record information into the L1 layer in the irreversible change recording method or the rewritable method by heat.

Patent document 1: Japanese Patent Application Laid Open NO. 2000-311346

Patent document 2: Japanese Patent Application Laid Open NO. 2001-23237

DISCLOSURE OF INVENTION

Subject to be Solved by the Invention

In such a dual-layer type optical disc (particularly, an optical disc in an opposite track path method), a specific position relationship is not defined between an edge of a lead-in area (particularly, an edge on the inner circumferential side) and an edge of a lead-out area (particularly, an edge on the outer circumferential side). However, there is such a technical problem that if there is a too large interval between the edge on the inner circumferential side of the lead-in area and the edge on the outer circumferential side of the lead-out area, a recording capacity to record therein a user's data becomes small by that much. On the other hand, there is also such a technical problem that if there is a too small interval between the edge on the inner circumferential side of the lead-in area and the edge on the outer circumferential side of the lead-out area, it is difficult or impossible to certainly secure a stable recording operation or reproduction operation.

It is therefore an object of the present invention to provide a recording medium on which a preferable lead-in area and a preferable lead-out area are formed, and a recording apparatus and method, as well as a computer program.

Means for Solving the Subject

Recording Medium

The above object of the present invention can be achieved by a recording medium provided with: a first recording layer and a second recording layer to record therein record information, and a control area (e.g. a lead-in area, a lead-out area, etc.) on the first recording layer and a control area on the second recording layer to record therein control information for controlling at least one of recording and reproduction of the record information, wherein a distance between an inner radius of the control area in the first recording layer and an outer radius of the control area in the second recording layer is larger than or equal to a first predetermined value.

According to the recording medium of the present invention, the record information is recorded into each of the first recording layer and the second recording layer. Each of the first recording layer and the second recording layer is provided with the control area to record therein the control information. Incidentally, with respect to the control information recorded in the control area, the whole information is not necessarily used to control at least one of the recording and the reproduction of the record information. It means that it is only necessary to control at least one of the recording and the reproduction of the record information, as a whole control area. For example, it means that even if dummy information having no meaning is recorded into the control area, it is only necessary to control at least one of the recording and the reproduction of the record information, as the whole control area.

Particularly in the present invention, the distance between (i) the area portion in the second recording layer corresponding to the edge on the inner circumferential side of the control area in the first recording layer) and (ii) the edge on the outer circumferential side of the control area in the second recording layer) is larger than or equal to a first predetermined value or more. In other words, the inner radius of the control area in the first recording layer and the outer circumferential side of the control area in the second recording layer are away from each other by a first predetermined value or more. The term "corresponding to" herein indicates that it exists at a substantially facing or opposed position in design (e.g. at substantially the same radial position). In an actual recording medium, it is not necessarily located at the facing position due to an influence or the like in the production process. The term "face" herein indicates a relationship that two points are actually at the same radial position. For example, as discussed in detail in Detailed Description later, the inner radius of the control area in the first recording layer and the outer radius of the control area in the second recording layer are away from each other by a length corresponding to "0.4 mm+a tolerance length (relative tolerance)". Thus, it is possible to secure a preferable recording operation or reproduction operation. In other words, it is possible to provide the preferable control area (i.e., the lead-in area and the lead-out area) which can secure the preferable recording operation or reproduction operation.

In one aspect of the recording medium of the present invention, the inner radius of the control area in the first recording layer and an inner radius of the control area in the second recording layer are disposed on same radius position.

According to this aspect, it is possible to receive the above-mentioned benefits, while the inner radius of the control area on said first recording layer and an inner radius of the control area on said second recording layer can be disposed on same radius position.

In this aspect, the control area in the second recording layer may be larger than the control area in the first recording layer.

By such construction, it is possible to receive the above-mentioned benefits, while the control area in the second recording layer may be larger than the control area in the first recording layer.

In another aspect of the recording medium of the present invention, an address in each of the first recording layer and the second recording layer is assigned in accordance with a decrement address method, the first recording layer is provided with an identification area in which identification information for identifying the recording medium is recorded, and an address of the outer radius of the control area in the second recording layer is equal to or greater than "00336Fh".

According to this aspect, it is possible to keep the inner radius of the control area in the first recording layer and the outer radius of the control area in the second recording layer apart, by a predetermined value or more. Therefore, the preferable control area is formed.

Incidentally, the decrement address method is a method of assigning an address, in which the value of the address decreases from the inner to the outer circumferential side in the first recording layer, and from the outer to the inner circumferential side in the second recording layer, in the case of the recording medium in the opposite track path method, for example.

In another aspect of the recording medium of the present invention, the first recording layer is provided with an identification area in which identification information for identifying the recording medium is recorded, and a distance between the inner radius of the control area in the first recording layer and an outer radius of the identification area is substantially equal to 186 μm, in a radial direction of the recording medium.

By such construction, even if there is the identification area, the preferable control area is formed.

In this aspect, the identification area may be an NBCA (Narrow Burst Cutting Area).

By such construction, the NBCA is provided, and yet, the preferable control area is formed.

In this aspect, the first predetermined value may be a value obtained by adding a tolerance length to 0.4 mm in a radial direction of the recording medium, in which the tolerance length indicates an acceptable range of a relative position shift between an address which is defined on the predetermined position in the first recording layer and an address which is related to the predetermined position in the second recording layer.

In general, in the recording medium, a position where an address in the first recording layer or the second recording layer is defined in design does not necessarily match a position where an address on the optical disc manufactured is actually defined, depending on the quality of a production process. In other words, there is a possibility that an optical disc is produced in which a certain address is located away from a radial position where the certain address is to be located in design. Thus, a predetermined area is not disposed in an intended position in design, and as a result, there is conceivably a case where the record information cannot be recorded into the second recording layer through an area portion of the first recording layer in which the record information is already recorded. In this case, the quality of the record information recorded in the second recording layer varies, depending on the recording state of the first recording layer, which is not preferable. However, by such construction, the preferable control area is formed in view of a position shift in the address. Incidentally, the "tolerance length" indicates the acceptable range of a relative position shift between an address which is defined on the predetermined position in the first recording layer and an address which is related to the predetermined position in the second recording layer. In other words, the "tolerance length" indicates the acceptable range of a relative position shift between an address which is defined on the predetermined position in the first recording layer and an address which is defined on the predetermined position in said second recording layer. In other words more, the "tolerance length" is the sum of: the acceptable range of a position shift in the first recording layer between a position where a predetermined address is defined in design and a position of the predetermined address on the actually produced recording medium; and the acceptable range of a position shift in the second recording layer between a position where a predetermined address is defined in design and a position of the predetermined address on the actually produced recording medium.

In another aspect of the recording medium of the present invention, a distance between an outer radius of the control area in the first recording layer and the outer radius of the control area in the second recording layer is larger than or equal to a second predetermined value.

For example, as discussed in detail in Detailed Description later, the outer radius of the control area in the first recording layer and the outer radius of the control area in the second recording layer are away from each other by a length corresponding to "a clearance length+the tolerance length (relative tolerance descried later)". Thus, it is possible to secure the preferable recording operation or reproduction operation. In other words, it is possible to provide the preferable control area (i.e., the lead-in area and the lead-out area) which can secure the preferable recording operation or reproduction operation.

In another aspect of the recording medium of the present invention, an address in each of the first recording layer and the second recording layer is assigned in accordance with a decrement address method, and an address of the outer radius of the control area in the second recording layer is equal to or greater than "003329h".

According to this aspect, it is possible to keep the inner radius of the control area in the first recording layer and the outer radius of the control area in the second recording layer apart, by the first predetermined value or more. Therefore, the preferable control area is formed.

In this aspect, the second predetermined value may be a sum of a tolerance length and a clearance length, in which the tolerance length indicates an acceptable range of a relative position shift between an address which is defined on the predetermined position in said first recording layer and an address which is related to the predetermined position in said second recording layer and the clearance length indicates a sum of a spot radius of laser light on said first recording layer in the case where the laser light, which is for recoding of record information onto said recording medium, is focused on said second recording layer and a relative eccentric shift of said first and second recording layers.

By such construction, as discussed in detail in Detailed Description later, the preferable control area is formed, in view of a position shift in the address and a clearance caused by the eccentric shift and the size of the spot of the laser light or the like.

In this aspect, to the distance between the outer radius of the control area in the first recording layer and the outer radius of the control area in the second recording layer may be substantially equal to 105 μm, in a radial direction of the recording medium.

By such construction, as discussed in detail in Detailed Description later, the preferable control area is formed, in view of the position shift and the clearance.

In another aspect of the recording medium of the present invention, the record information is recorded into the first recording layer in one direction, and the record information is recorded into the second recording layer in another direction different from the one direction.

According to this aspect, it is possible to receive the above-mentioned various benefits on the recording medium in the opposite track path method.

(Recording Apparatus)

The above object of the present invention can be also achieved by a recording apparatus provided with: a first recording device for recoding record information onto a recording medium provided with: a first recording layer and a second recording layer to record therein the record information; a second recording device for recording control information for controlling at least one of recording and reproduction of the record information, into each of the first recording layer and the second recording layer; and a controlling device for controlling the second recording device to record the control information, such that an inner radius of an area portion in which the control information is recorded in the first recording layer and an outer radius of an area portion in which the control information is recorded in the second recording layer is larger than or equal to a first predetermined value.

According to the recording apparatus of the present invention, by the operation of the first recording device, it is possible to preferably record the record information including video information, audio information or the like, onto the recording medium provided with both the first and second recording layers. Moreover, by the operation of the second recording device, it is possible to record the control information.

Particularly, in the present invention, by the operation of the controlling device, the control information is recorded such that the inner radius of the area portion in which the control information is recorded in the first recording layer and the outer radius of the area portion in which the control information is recorded in the second recording layer is larger than or equal to a first predetermined value or more. In other words, by the operation of the controlling device, the control information is recorded such that the area portion in the second recording layer corresponding to the edge on the inner circumferential side of the area portion in which the control information is recorded in the first recording layer and the edge on the outer circumferential side of the area portion in which the control information is recorded in the second recording layer are away from each other by a first predetermined value or more. Incidentally, in the explanation below, the area portion in which the control information is recorded is referred to as the "control area", as occasion demands. For example, as discussed in detail in Detailed Description later, the control information is recorded such that the inner radius of the control area in the first recording layer and the outer radius of the control area in the second recording layer are away from each other by a length corresponding to "0.4 mm+the tolerance length (relative tolerance)". Thus, it is possible to secure a preferable recording operation or reproduction operation. In other words, it is possible to provide the preferable control area (i.e., the lead-in area and the lead-out area) which can secure the preferable recording operation or reproduction operation.

In one aspect of the recording medium of the present invention, the controlling device controls the second recording device to record the control information such that the inner radius of the area portion in which the control information is recorded in the first recording layer and an inner radius of the area in which the control information is recorded in the second recording layer are disposed on same radius position.

According to this aspect, it is possible to receive the above-mentioned benefits, while the inner radius of the control area on said first recording layer and an inner radius of the control area on said second recording layer can be disposed on same radius position.

In this aspect, the controlling device controls the second recording device to record the control information such that the area portion in which the control information is recorded in the second recording layer is larger than the area portion in which the control information is recorded in the first recording layer.

By such construction, it is possible to receive the above-mentioned benefits, while the control area in the second recording layer may be larger than the control area in the first recording layer.

In another aspect of the recording apparatus of the present invention, an address in each of the first recording layer and the second recording layer is assigned in accordance with a decrement address method, the first recording layer comprises an identification area in which identification information for identifying the recording medium is recorded, and an address of the outer radius of the control area in the second recording layer is equal to or greater than "00336Fh".

According to this aspect, it is possible to keep the inner radius of the control area in the first recording layer and the outer radius of the control area in the second recording layer apart, by the first predetermined value or more. Therefore, it is possible to record the control information so as to form the preferable control area.

In another aspect of the recording apparatus of the present invention, it may be constructed such that the first recording layer comprises an identification area in which identification information for identifying the recording medium is recorded, and a distance between the inner radius of the area portion in which the control information is recorded in the first recording layer and an outer radius of the identification area may be substantially equal to 186 µm, in a radial direction of the recording medium.

By such construction, the control information and the identification information hardly interrupt each other. Therefore, it is possible to record the control information so as to form the preferable control area.

In this aspect, the identification area may be an NBCA (Narrow Burst Cutting Area).

By such construction, the NBCA is provided, and yet, the preferable control area is formed.

In this aspect, the first predetermined value may be a value obtained by adding a tolerance length to 0.4 mm in a radial direction of the recording medium, in which the tolerance length indicates an acceptable range of a relative position shift between an address which is defined on the predetermined position in said first recording layer and an address which is related to the predetermined position in said second recording layer.

By such construction, it is possible to record the control information so as to form the preferable control area in view of a position shift in the address.

In another aspect of the recording apparatus of the present invention, the controlling device controls the second recording device to record the control information, such that a distance between an outer radius of the area portion in which the control information is recorded in the first recording layer and the outer radius of the area portion in which the control information is recorded in the second recording layer is larger than or equal to a second predetermined value.

For example, as discussed in detail in Detailed Description later, the control information is recorded such that the outer radius of the control area in the first recording layer and the outer radius of the control area in the second recording layer are away from each other by a length corresponding to "the clearance length+the tolerance length (relative tolerance descried later)". Thus, it is possible to secure the preferable recording operation or reproduction operation. In other words, it is possible to preferably record the control information so as to secure the preferable recording operation or reproduction operation. As a result, it is possible to provide the preferable control area (i.e., the lead-in area and the lead-out area).

In another aspect of the recording apparatus of the present invention, an address in each of the first recording layer and the second recording layer is assigned in accordance with a decrement address method, and an address of the outer radius of the area portion in which the control information is recorded in the second recording layer is equal to or greater than "003329h".

According to this aspect, it is possible to keep the inner radius of the control area in the first recording layer and the outer radius of the control area in the second recording layer apart, by the first predetermined value or more. Therefore, it is possible to record the control information so as to form the preferable control area In this aspect, the second predetermined value may be a sum of a tolerance length and a clearance length, in which the tolerance length indicates an acceptable range of a relative position shift between an address which is defined on the predetermined position in said first recording layer and an address which is related to the predetermined position in said second recording layer and the clearance length indicates a sum of a spot radius of laser light on the first recording layer in the case where the laser light, which is for recoding of record information onto the recording medium, is focused on the second recording layer and a relative eccentric shift of the first and second recording layers.

By such construction, as discussed in detail in Detailed Description later, the preferable control area is formed, in view of a position shift in the address and a clearance caused by the eccentric shift and the size of the spot of the laser light or the like.

In this aspect, the distance between the a outer radius of the area portion in which the control information is recorded in the first recording layer and the outer radius of the area portion in which the control information is recorded in the second recording layer may be substantially equal to 105 μm, in a radial direction of the recording medium.

By such construction, as discussed in detail in Detailed Description later, the preferable control area is formed, in view of the position shift and the clearance.

In another aspect of the recording apparatus of the present invention, the record information is recorded into the first recording layer in one direction, and the record information is recorded into the second recording layer in another direction different from the one direction.

According to this aspect, it is possible to receive the above-mentioned various benefits on the recording medium in the opposite track path method.

(Recording Method)

The above object of the present invention can be also achieved by A recording method in a recording apparatus provided with: a first recording device for recoding record information onto a recording medium provided with: a first recording layer and a second recording layer to record therein the record information; and a second recording device for recording control information for controlling at least one of recording and reproduction of the record information, into each of the first recording layer and the second recording layer, the recording method provided with: a first controlling process of controlling at least one of the first recording device and the second recording device to record at least one of the record information and the control information; and a second controlling process of controlling the second recording device to record the control information, such that a distance between an inner radius of an area portion in which the control information is recorded in the first recording layer and an outer radius of an area portion in which the control information is recorded in the second recording layer is larger than or equal to a first predetermined value.

According to the recording method of the present invention, it is possible to receive the same benefits as those owned by the above-mentioned recording apparatus of the present invention.

Incidentally, in response to the various aspects of the above-mentioned recording apparatus of the present invention, the recording method of the present invention can adopt various aspects.

(Computer Program)

The above object of the present invention can be also achieved by a computer program of instructions for recording control and for tangibly embodying a program of instructions executable by a computer provided in the above-mentioned recording apparatus of the present invention (including its various aspects), to make the computer function as at least one portion of the recording apparatus (specifically, e.g. the controlling device).

According to the computer program of the present invention, the above-mentioned recording apparatus of the present invention can be relatively easily realized as a computer reads and executes the computer program from a program storage device, such as a ROM, a CD-ROM, a DVD-ROM, and a hard disk, or as it executes the computer program after downloading the program through a communication device.

Incidentally, in response to the various aspects of the above-mentioned recording apparatus of the present invention, the computer program of the present invention can adopt various aspects.

The above object of the present invention can be also achieved by a computer program product in a computer-readable medium for tangibly embodying a program of instructions executable by a computer provided in the above-mentioned recording apparatus of the present invention (including its various aspects), to make the computer function as at least one portion of the recording apparatus (specifically, e.g. the controlling device).

According to the computer program product of the present invention, the above-mentioned recording apparatus can be embodied relatively readily, by loading the computer program product from a recording medium for storing the computer program product, such as a ROM (Read Only Memory), a CD-ROM (Compact Disc-Read Only Memory), a DVD-ROM (DVD Read Only Memory), a hard disk or the like, into the computer, or by downloading the computer program product, which may be a carrier wave, into the computer via a communication device. More specifically, the computer program product may include computer readable codes to cause the computer (or may comprise computer readable instructions for causing the computer) to function as the above-mentioned recording apparatus.

These effects and other advantages of the present invention will become more apparent from the following embodiments.

As explained above, in the recording medium of the present invention, the edge on the inner circumferential side of the control area in the first recording layer and the edge on the outer circumferential side of the control area in the second recording area are away from each other by a predetermined value or more. Therefore, the preferable lead-in area and the preferable lead-out area (i.e. the control area) are formed. Moreover, the recording apparatus of the present invention is provided with the first recording device, the second recording device, and the controlling device. The recording method of the present invention is provided with the first controlling process and the second controlling process. Therefore, it is possible to preferably record the record information, and as a result, the preferable lead-in area and the preferable lead-out area are formed.

BRIEF DESCRIPTION OF DRAWINGS

FIG. 1 is a substantial plan view showing the basic structure of an optical disc in an embodiment of the present invention.

FIG. 2 is a schematic cross sectional view of the optical disc in the embodiment and a corresponding conceptual diagram showing a recording area structure in the radial direction thereof.

FIG. 3 is a data structural diagram conceptually showing a specific area structure of the optical disc in the embodiment.

FIG. 4 are schematic conceptual views conceptually showing a relative tolerance.

FIG. 5 are data structural diagrams particularly showing a radial position relationship of actual areas on the optical disc, depending on the extent of a position shift.

FIG. 6 are data structural diagrams explaining an aspect of changing the address of radial position of an edge on the inner circumferential side of a lead-in area, or the like, in accordance with the radial position of an edge on the outer circumferential side of an NBCA.

FIG. 7 is a data structural diagram conceptually showing another specific area structure of the optical disc in the embodiment.

FIG. 8 are schematic conceptual views conceptually showing an eccentric clearance out of clearance.

FIG. 9 are schematic conceptual views conceptually showing a spot clearance out of clearance.

FIG. 10 is a block diagram conceptually showing the basic structure of a recording/reproducing apparatus in the embodiment.

FIG. 11 is a flowchart conceptually showing a flow of the operation of the recording/reproducing apparatus in the embodiment.

DESCRIPTION OF REFERENCE CODES 100, 100a optical disc
102 lead-in area
106 NBCA
118 lead-out area
200 recording/reproducing apparatus
352 optical pickup
353 signal recording/reproducing device
354, 359 CPU
355, 360 memory

BEST MODE FOR CARRYING OUT THE INVENTION

Hereinafter, the best mode for carrying out the present invention will be discussed in order for each embodiment, with reference to the drawings.

Embodiment of Recording Medium

At first, with reference to FIG. 1 to FIG. 11, an optical disc as an embodiment according to the recording medium of the present invention will be discussed.

(1) Basic Structure

At first, with reference to FIG. 1 and FIG. 2, an explanation will be given to the basic structure of the optical disc as being an embodiment according to the recording apparatus of the present invention. FIG. 1 is a substantial plan view showing the basic structure of an optical disc 100 in the embodiment, and FIG. 2 is a schematic cross sectional view of the optical disc 100 and a corresponding conceptual diagram showing a recording area structure in the radial direction thereof.

As shown in FIG. 1, the optical disc 100 has a recording surface on a disc main body with a diameter of about 12 cm, as is a DVD. On the recording surface, the optical disc 100 is provided with: a center hole 101 as being the center; a lead-in area 102 and a lead-out area 118, which constitutes one specific example of the "control area" of the present invention; data areas 105 and 115; and middle areas 109 and 119. Then, in the optical disc 100, recording layers and the like are laminated on a transparent substrate 110, for example. In each recording area of the recording layers, a track or tracks, such as groove tracks and land tracks, are alternately placed, spirally or concentrically, with the center hole 101 as the center. Moreover, on the track, data is divided by a unit of ECC block and recorded. The ECC block is a data management unit by which the recording information can be error-corrected.

Incidentally, the present invention is not particularly limited to the optical disc having the three areas as described above. For example, even if the lead-in area 102, the lead-out area 118 or the middle area 109 (119) do not exist, a data structure and the like explained below can be constructed. Moreover, as described later, the lead-in area 102d the lead-out area 118 or the middle area 109 (119) may be further segmentized.

Particularly, the optical disc 100 in the embodiment, as shown in FIG. 2, has such a structure that an L0 layer and an L1 layer, which constitute one example of the "first and second recording layers" of the present invention, respectively, are laminated on the transparent substrate 110. Upon the recording and reproduction of such a dual-layer type optical disc 100, the data recording/reproduction in the L0 layer or the L1 layer is performed, depending on which recording layer has the focus position of laser light LB, irradiated from the lower side to the upper side in FIG. 2. In particular, in the L0 layer, the data is recorded from the inner to the outer circumferential side, while in the L1 layer, the data is recorded from the outer to the inner circumferential side. In other words, the optical disc 100 in the embodiment corresponds to an optical disc in the opposite track path method. Even an optical disc in a parallel track path method can also receive various benefits described later, by adopting a structure discussed below.

The optical disc 100 in the embodiment is provided with IDTA (Inner Disc Testing Areas) 103a and 113a, RMA (Recording Management Areas) 104 and 114, and a NBCA (Narrow Burst Cutting Area) 106, if necessary, on the inner circumferential side of the lead-in area 102 and the lead-out area 118. Moreover, it is provided with ODTA (Outer Disc Testing Areas) 103b and 113b on the outer circumferential side of the middle areas 109 and 119.

The IDTA 103a and 113a and the ODTA 103b and 113b are recording areas to perform an OPC (Optimum Power Control) process of adjusting (or calibrating) the laser power of laser light LB, in recording the data onto the optical disc 100. An OPC pattern is recorded into the IDTA 103a and 113a or the ODTA 103b and 113b while the laser power is changed in stages and the reproduction quality (e.g. asymmetry, etc.) of the recorded OPC pattern is measured, by which an optimum laser power in recording the data is calculated. In particular, the optimum laser power in recording the data into a recording area on the relatively inner circumferential side of the optical disc is preferably calculated by recording the OPC pattern into the IDTA 103a and 113a. Moreover, the optimum laser power in recording the data into a recording area on the relatively outer circumferential side of the optical disc is preferably calculated by recording the OPC pattern into the ODTA 103b and 113b. In order to preferably perform the OPC process without influence of the other recording layer, when the OPC process is performed by using the IDTA 113a or the ODTA 113b of the L1 layer, the laser light LB is irradiated through the L0 layer in which the data is unrecorded, to thereby record the OPC pattern. Obviously, the same is true for the IDTA 103a and the ODTA 103b of the L0 layer.

Particularly, in the recording area in which the normal data is recorded, such as the data areas 105 and 115, of the optical disc 100, the data is recorded into the data area 115 of the L1 layer after the data is recorded into the data area 105 of the L0 layer, as a general rule. In other words, by irradiating the laser light LB through the data area 105 of the L0 layer in which the data is recorded, the data is recorded into the data area 115 of the L1 layer. The same is true for other recording areas, as a general rule.

The RMA 104 and 114 are recording areas to record therein various management information for managing the recording of the data onto the optical disc 100. Specifically, the management information or the like which indicates the arrangement or the recording state or the like of the data recorded on the optical disc 100, for example, is recorded.

In the NBCA 106, which constitutes one specific example of the identification area" of the present invention, various identification data is recorded, which is to identify the optical disc 100, including the production number or the like of the optical disc 100, for example. In particular, the various identification data is recorded by a cutting pattern in a bar code shape which is formed on the recording surface of the optical disc 100 by the laser light.

Moreover, the optical disc 100 in the embodiment is not limited to a dual-layer, single-sided type, but may be a dual-layer, double-sided type. Furthermore, the optical disc 100 in the embodiment is not limited to the optical disc having the two recording layers, as described above, but may be an optical disc of a multilayer type which has three or more layers.

Moreover, the above explanation is made as if the positions of the middle areas 109 and 119 were already fixed; however, in an actual finalize process, the middle areas 109 and 119 may be disposed on the further inner circumferential side. Even in that case, it is preferable to satisfy an aspect of the arrangement of the area, discussed below.

(2) Specific Area Structure

Next, with reference to FIG. 3 to FIG. 6, the specific area structure of the optical disc 100 in the embodiment will be discussed. Here, the outline of the specific area structure will be explained by using FIG. 3, and supplementary or more detailed explanation will be given by using FIG. 4 to FIG. 6. FIG. 3 is data structural diagrams conceptually showing the specific area structure of the optical disc 100 (particularly, an area structure near the lead-in area 102 and the lead-out area 118).

As shown in FIG. 3, the NBCA 106 has a tolerance of ±0.06 mm at the start position and the end position thereof. The NBCA 106 is disposed in a range of "r=22.71±0.06 mm" to "r=23.51±0.06 mm" ("r" indicates a radial position of the optical disc 100).

On the other hand, the acceptable range of a position shift in the L0 layer is 40 μm, so that the radial position of the edge on the inner circumferential side of the lead-in area 102 is disposed in a range of "23.656 mm" to "23.696 mm".

Therefore, a space area having a length of "86 μm" to "246 μm" in the radial direction is disposed between the edge on the inner circumferential side of the lead-in area 102 and the edge on the outer circumferential side of the NBCA 106. In other words, a space area having a length of at least "86 μm" in the radial direction is disposed between the edge on the inner circumferential side of the lead-in area 102 and the edge on the outer circumferential side of the NBCA 106. As a general rule, the data is not recorded in the space area. Moreover, the address of the edge on the outer circumferential side of the lead-in area 102 is "FFD000h".

Particularly in the embodiment, the address of the edge on the outer circumferential side of the lead-out area 118 is "00336Fh", and the radial position thereof is in a range of "24.096 mm" to "24.136 mm". This corresponds to a position obtained by shifting to the outer circumferential side by a length corresponding to the "0.4 mm+a relative tolerance", from an area portion in the L1 layer corresponding to the edge on the inner circumferential end of the lead-in area 102. This numerical value of "0.4 mm" is a minimum length between the edge on the outer circumferential side of the lead-out area 118 and the edge on the inner circumferential side of the lead-in area 102 in which the recording operation or reproduction operation can be preferably performed. In other words, if the edge on the inner circumferential side of the lead-in area 102 and the edge on the outer circumferential side of the lead-out area 118 are away from each other, at least by "0.4 mm" (or more), it is possible to preferably perform the recording operation or reproduction operation with respect to the optical disc 100. Incidentally, the edge on the inner circumferential side of the lead-in area 102 corresponds to the edge on the inner circumferential side of the lead-out area 118. In other words, the edge on the inner circumferential side of the lead-in area 102 and the edge on the inner circumferential side of the lead-out area 118 are disposed at substantially the same radial position in design.

For reference, the address of the edge on the inner circumferential side of the RMA 104 is "FFDE31h", and the address of the edge on the outer circumferential side of the RMA 104 is "FFDBBDh". Moreover, the radial position of the edge on the outer circumferential side of the RMA 104 is in a range of "22.58 mm" to "22.62 mm". The address of the edge on the inner circumferential side of the RMA 114 is "0024E6h", and the address of the edge on the outer circumferential side of the RMA 114 is "0025A2h". Moreover, the radial position of the edge on the inner circumferential side of the RMA 114 is in a range of "22.385 mm" to "22.425 mm", and the radial position of the edge on the outer circumferential side of the RMA 114 is in a range of "22.475 mm" to "22.515 mm".

Incidentally, the relative tolerance, which constitute one example of "the tolerance length" of the present invention, indicates the sum of (i) the acceptable range of a position shift between a position where a predetermined address is to be originally disposed in design and a position where the predetermined address is actually disposed on the optical disc 100 in the L0 layer; and (ii) the acceptable range of a position shift between a position where a predetermined address is to be originally disposed in design and a position where the predetermined address is actually disposed on the optical disc 100 in the L1 layer. Namely, the relative tolerance indicates the acceptable range of a relative position shift (or the relative position shift itself) between (i) the address which is defined on a predetermined radial position in the L0 layer and (ii) the address which is related to the predetermined radial position in the L1 layer (i.e. the address which is defined on the predetermined radial position in the L1 layer).

Now, the relative tolerance will be discussed in more detail with reference to FIG. 4. FIG. 4 are schematic conceptual views conceptually showing the relative tolerance.

As shown in FIG. 4(a), it is assumed that an address "X" is defined at a radial position "r" in design. By this, the arrangement of the lead-in area 102, the data areas 105 and 115, the lead-out area 118, and the middle areas 109 and 119 is defined, in design. At this time, there is likely a case where the address "X" is not accurately defined at the radial position "r" where the address "X" is to be originally defined, due to manufacturing errors of a stampa or the like, which is to form a land pre-pit or wobble which defines the address; in other words, due to manufacturing errors of an original disc for producing the stampa, errors in the radial position of a cutting machine for generating the original disc, uneven track pitches, or the like. Alternatively, there is likely a case where the address "X" is not accurately defined at the radial position "r" where the address "X" is to be originally disposed, due to an individual difference in heat contraction or the like in the production of the optical disc 100.

Specifically, as shown in FIG. 4(b), it is likely that an address "X-ΔX" is defined at the radial position "r" where the address "X" is to be originally disposed. At this time, the address "X" is disposed at a radial position "r-Δr1" obtained by shifting from the radial position "r" to the inner circumferential side by "Δr1". This "Δr1" at this time is referred to the position shift in each recording layer, and the acceptable range of the position shift is referred to a "position tolerance". The position shift is likely caused in each recording layer. Namely, the position shift in the L0 layer and the position shift in the L1 layer can be caused, separately and independently. In this case, the acceptable range of the position shift (i.e. position tolerance) can be determined from the viewpoint of security of the preferable recording operation or reproduction operation. For example, in a DVD-R, which is one specific example of the optical disc 100, the acceptable range of the position shift is determined to be from "−20 μm" to "20 μm". On the basis of the acceptable range, the sum of the maximum value of the position shift in the L0 layer and the maximum value of the position shift in the L1 layer is the relative tolerance. In this case, the relative tolerance is "20+20=40 μm". Therefore, as shown in FIG. 3, the edge on the outer circumferential side of the lead-out area 118 is located at a position obtained by shifting to the outer circumferential side by "0.4 mm+40 μm=0.44 mm", from the area portion in the L1 layer corresponding to the edge on the inner circumferential side of the lead-in area 102.

Incidentally, a relative difference of the actual position shift of the L0 layer and the actual position shift of the L1 layer may be regarded as the relative tolerance. In other words, a relative difference of the maximum value of the position shift actually caused in the L0 layer and the maximum value of the position shift actually caused in the L1 layer may be regarded as the relative tolerance of the optical disc 100.

As described above, according to the optical disc 100 in the embodiment, the edge on the outer circumferential side of the lead-out area 118 is located at a position obtained by shifting to the outer circumferential side by a length corresponding to "0.4 mm+the relative tolerance", from the area portion in the L1 layer corresponding to the edge on the inner circumferential side of the lead-in area 102. By this, a situation explained by using FIG. 5 is realized, depending on the extent of the position shift in each of the L0 layer and the L1 layer. FIG. 5 are data structural diagrams particularly showing a radial position relationship of actual areas on the optical disc, depending on the extent of the position shift.

Incidentally, in the explanation of FIG. 5, the maximum value of the position shift in the L0 layer is "a", and the maximum value of the position shift in the L1 layer is "b". Therefore, in this case, the relative tolerance is "a+b".

At first, an explanation will be given to the case where the position shift in the L0 layer and the position shift in the L1 layer are both "0" (i.e. a difference in the relative position is "0"). At this time, it is assumed that the address "X" in the L0 layer defined at the radial position "r" and the address "Y" in the L0 layer defined at the radial position "r" are in such a relationship that they correspond to each other. For example, it is assumed that "X" and "Y" are in a complement number relationship with each other or in such a relationship that a predetermined offset value is added, and that "X" and "Y" are in such a relationship that they are defined at facing positions (at the same radial position) in design. Here, it is assumed that the address of the edge on the inner circumferential side of the lead-in area 102 is "X" and that the address of the edge on the inner circumferential side of the lead-out area 118 is "Y". At this time, since the position shift in the L0 layer and the position shift in the L1 layer are both "0", even on the actual optical disc 100, as shown in FIG. 5(a), an area portion in the L0 layer represented by the address "X" and an area portion in the L1 layer represented by the address "Y" are in such a relationship that they face or are opposed to each other. In other words, each area is disposed at the radial position defined in design. Therefore, the edge on the inner circumferential side of the lead-in area 102 and the edge on the outer circumferential side of the lead-out area 118 are away from each other, at least by "0.4 mm".

On the other hand, the case where the position shift of the L0 layer is a negative maximum value "−a" and the position shift of the L1 layer is a positive maximum value "+b" will be explained. Namely, an explanation will be given to the case where the radial position where the address is actually defined is shifted by "a" to the inner circumferential side from the radial position where the address is originally to be defined in the L0 layer and the radial position where the address is actually defined is shifted by "b" to the outer circumferential side from the radial position where the address is originally to be defined in the L1 layer. In this case, as shown in FIG. 5(b), the address "X" in the L0 layer which is originally to be defined at the radial position "r" is defined at a radial position "r-a". Moreover, the address "Y" in the L1 layer which is originally to be defined at the radial position "r" is defined at a radial position "r+b". Along with this, the radial position of each area in the L0 layer and the L1 layer differs from the radial position defined in design, shown in FIG. 5(a). Specifically, for example, the edge on the inner circumferential side of the lead-in area 102 is shifted to the inner circumferential side, and the edge on the outer circumferential side of the lead-out area 118 is shifted to the outer circumferential side. Even in this case, the edge on the inner circumferential side of the lead-in area 102 and the edge on the outer circumferential side of the lead-out area 118 are away from each other, at least by "0.4 mm".

On the other hand, the case where the position shift of the L0 layer is a positive maximum value "+a" and the position shift of the L1 layer is a negative maximum value "−b" will be explained. Namely, an explanation will be given to the case where the radial position where the address is actually defined is shifted by "a" to the outer circumferential side from the radial position where the address is originally to be defined in the L0 layer and the radial position where the address is actually defined is shifted by "b" to the inner circumferential side from the radial position where the address is originally to be defined in the L1 layer. In this case, as shown in FIG. 5(c), the address "X" in the L0 layer which is originally to be defined at the radial position "r" is defined at a radial position "r+a". Moreover, the address "Y" in the L1 layer which is originally to be defined at the radial position "r" is defined at a radial position "r-b". Along with this, the radial position of each area in the L0 layer and the L1 layer differs from the radial position defined in design, shown in FIG. 5(a). Specifically, for example, the edge on the inner circumferential side of the lead-in area 102 is shifted to the outer circumferential side, and the edge on the outer circumferential side of the lead-out area 118 is shifted to the inner circumferential side. Even in this case, the edge on the inner circumferential side of the lead-in area 102 and the edge on the outer circumferential side of the lead-out area 118 are away from each other, at least by "0.4 mm".

As described above, even if there is a position shift in each of the L0 layer and the L1 layer, by providing the lead-in area 102 and the lead-out area 118 as shown in FIG. 3, it is possible to keep the edge on the inner circumferential side of the lead-in area 102 and the edge on the outer circumferential side of the lead-out area 118 apart, at least by 0.4 mm. Thus, even if there is a position shift in each of the L0 layer and the L1 layer, it is possible to secure the preferable recording operation or reproduction operation. In other words, it is possible to provide the preferable lead-in area 102 and the preferable lead-out area 118 which can secure the preferable recording operation or reproduction operation. These can be realized, particularly by defining the address or radial position of the edge on the outer circumferential side of the lead-out area 118.

In particular, since the optical disc 100 is provided with the NBCA 106, the edge on the inner circumferential side of the lead-in area 102 is disposed on the outer circumferential side of the outer circumferential edge of the NBCA 106. However, by providing the lead-in area 102 and the lead-out area 118 as described above, even if the NBCA 106 is provided, it is possible to keep the edge on the inner circumferential side of the lead-in area 102 and the edge on the outer circumferential side of the lead-out area 118 apart, at least by 0.4 mm.

Moreover, it is also possible to provide the lead-in area 102 and the lead-out area 118, depending on the extent of the relative tolerance. Thus, it is unnecessary to keep the edge on the inner circumferential side of the lead-in area 102 and the edge on the outer circumferential side of the lead-out area 118 apart, beyond necessity. As a result, there is also such an advantage that the size of the data areas 105 and 115 can be relatively increased.

Incidentally, in the above-mentioned optical disc 100, the address of the edge on the outer circumferential side of the lead-out area 118 is designated to be "00336Fh". However, from the viewpoint of security of the preferable recording operation or reproduction operation, the address of the edge on the outer circumferential side of the lead-out area 118 may be equal to or greater than "00336Fh" (i.e. on the further outer circumferential side). However, from the viewpoint of a relative increase in the size of the data areas 105 and 115, the address of the edge on the outer circumferential side of the lead-out area 118 is preferably "00336Fh" or a value close to "00336Fh".

Moreover, the NBCA 106 does not necessarily have a length in the radial direction, as shown in FIG. 3. For example, there is a case where the length in the radial direction of the NBCA 106 is shorter than that shown in FIG. 3. In that case, in accordance with the radial position of the edge on the outer circumferential side of the NBCA 106, it is possible to change the address or radial position of the edge on the inner circumferential side or the edge on the outer circumferential side of the lead-in area 102, or the address or radial position of the edge on the inner circumferential side or the edge on the outer circumferential side of the lead-out area 118. With reference to FIG. 6, an explanation will be given to the aspect of changing the address or radial position of the edge on the inner circumferential side of the lead-in area 102 or the like, in accordance with the radial position of the edge on the outer circumferential side of the NBCA 106. FIG. 6 are data structural diagrams explaining the aspect of changing the address of radial position of the edge on the inner circumferential side of the lead-in area 102, or the like, in accordance with the radial position of the edge on the outer circumferential side of the NBCA 106.

As shown in FIG. 6(a), if the radial position of the edge on the outer circumferential side of the NBCA 106 is "r1 mm", the radial position of the edge on the inner circumferential side of the lead-in area 102 is "r1+0.126 mm (or more)". Then, the edge on the outer circumferential side of the lead-out area 118 is disposed at a position obtained by shifting to the outer circumferential side by a length corresponding to "0.4 mm+relative tolerance (or more)", from the area portion in the L1 layer corresponding to the edge on the inner circumferential side of the lead-in area 102.

On the other hand, as shown in FIG. 6(b), if the radial position of the edge on the outer circumferential side of the NBCA 106 is "r2 mm (r2<r1)", the radial position of the edge on the inner circumferential side of the lead-in area 102 is "r2+0.126 mm (or more)". Then, the edge on the outer circumferential side of the lead-out area 118 is disposed at a position obtained by shifting to the outer circumferential side by a length corresponding to "0.4 mm+relative tolerance (or more)", from the area portion in the L1 layer corresponding to the edge on the inner circumferential side of the lead-in area 102.

In summary, the edge on the inner circumferential side of the lead-in area 102 is disposed at a position obtained by shifting to the outer circumferential side, at least by 0.126 mm (126 μm), from the edge on the outer circumferential side of the NBCA 106. Moreover, the edge on the outer circumferential side of the lead-out area 118 is disposed at a position obtained by shifting to the outer circumferential side, at least by a length corresponding to "0.4 mm+relative tolerance", from the area portion in the L1 layer corresponding to the edge on the inner circumferential side of the lead-in area 102. Alternatively, the edge on the inner circumferential side of the lead-in area 102 may be disposed at a position obtained by shifting to the outer circumferential side, at least by 0.086 mm (86 μm), from the edge on the outer circumferential side of the NBCA 106.

In such construction, even if there is a position shift in each of the L0 layer and the L1 layer, it is possible to keep the edge on the inner circumferential side of the lead-in area 102 and the edge on the outer circumferential side of the lead-out area 118 apart, at least by 0.4 mm, as described above. In other words, it is possible to provide the preferable lead-in area 102 and the preferable lead-out area 118 which can secure the preferable recording operation or reproduction operation. It is obvious that the other various benefits can be received.

Incidentally, as long as it is possible to keep the edge on the inner circumferential side of the lead-in area 102 and the edge on the outer circumferential side of the lead-out area 118 apart, at least by 0.4 mm, regardless of the presence or absence of a position shift in each of the L0 layer and the L1 layer, or regardless of the extent thereof, the address or radial position of the edge on the inner circumferential side or the edge on the outer circumferential side of the lead-in area 102, or the address or radial position of the edge on the inner circumferential side or the edge on the outer circumferential side of the lead-out area 118 is not limited to the above-mentioned specific numerical value. However, as in the above-mentioned embodiment, if the address or radial position is defined in advance, it is unnecessary to determine the address or radial position during the recording operation of a recording/reproducing apparatus described later, which is preferable.

(3) Another Specific Area Structure

Next, with reference to FIG. 7 to FIG. 9, another specific area structure will be discussed. Here, the outline of another specific area structure will be explained by using FIG. 7, and supplementary or more detailed explanation will be given by using FIG. 8 and FIG. 9. FIG. 7 is a data structural diagram conceptually showing another specific area structure of the optical disc 100 (particularly an area structure near the lead-in area 102 and the lead-out area 118). Incidentally, the same constitutional elements as those explained in FIG. 1 to FIG. 6 described above carry the same numerical references, and the explanation thereof will be omitted.

Here, as another specific area structure, the area structure of an optical disc 100a which is not provided with the NBCA 106 will be discussed.

As shown in FIG. 7, in the optical disc 100a which is not provided with the NBCA 106, the address of the edge on the inner circumferential side of the lead-in area 102 is "FFDBBBh", and the radial position thereof is in a range of "22.58 mm" to "22.62 mm". Moreover, the address of the edge on the inner circumferential side of the lead-out area 118, which is an area portion corresponding to the edge on the inner circumferential side of the lead-in area 102, is "002682h". In the lead-out area 118, an Optional IDTA is provided, which is an additional or optional IDTA. The edge on the inner circumferential side of the Optional IDTA is disposed at a position obtained by shifting to the outer circumferential side, by a length corresponding to the "relative tolerance+clearance", from the edge on the inner circumferential side of the lead-out area 118. For example, if the relative tolerance is "40 µm" and the clearance is "84 µm", the edge on the inner circumferential side of the Optional IDTA is disposed at a position obtained by shifting to the outer circumferential side, by a length corresponding to "40+84=124 µm", from the edge on the inner circumferential side of the lead-out area 118.

The address of the edge on the outer circumferential side of the lead-in area 102 is "FFD000h", and the radial position thereof is in a range of "23.96 mm" to "24 mm". The edge on the outer circumferential side of the lead-out area 118 is disposed at a position obtained by shifting to the outer circumferential side, by a length corresponding to the "relative tolerance+clearance" (e.g. "40+65=105 µm"), from the area portion in the L1 layer corresponding to the edge on the outer circumferential side of the lead-in area 102. The address of the edge on the outer circumferential side of the lead-out area 118 is "003329h", and the radial position thereof is in a range of "24.065 mm" to "24.105 mm". Therefore, the edge on the inner circumferential side of the lead-in area 102 and the edge on the outer circumferential side of the lead-out area 118 are away from each other, substantially by about "1.5 mm".

Incidentally, the clearance in the embodiment corresponds to the sum of a clearance related to an eccentricity corresponding to a shift of the center positions or the like of the L0 layer and the L1 layer (hereinafter referred to as an "eccentric clearance", as occasion demands) and a clearance related to the size of a beam spot of the defocused laser light (hereinafter referred to as a "spot clearance", as occasion demands).

Now, the clearance will be discussed in more detail with reference to FIG. 8 and FIG. 9. FIG. 4 are schematic conceptual views conceptually showing the relative tolerance. FIG. 8 are schematic conceptual views conceptually showing the eccentric clearance out of the clearance. FIG. 9 are schematic conceptual views conceptually showing the spot clearance out of the clearance.

As shown in FIG. 8(*a*), in the case of the optical disc 100 without an eccentricity, an address "X" defined at the radial position "r" in the L0 layer and an address "Y" defined at the radial position "r" in the L1 layer are in such a relationship that they face (or are opposed) to each other the track of radial position "r". Incidentally, the eccentricity indicates a shift in the center position of each layer. Here, a relative shift in the center position in pasting the L0 layer and the L1 layer is referred to the eccentricity.

On the other hand, as shown in FIG. 8(*b*), in the case of the optical disc 100 with an eccentricity, an address "X" defined at the radial position firm in the L1 layer and an address "Y" defined at the radial position "r" in the L0 layer face only at two points on the track of radial position "r". In other words, the track of the L1 layer and the track of the L0 layer, which are to be originally defined at the facing positions, do not face in most places. Specifically, the maximum acceptable value of the eccentricity corresponds to the eccentric clearance. FIG. 8(*b*) shows a case where the maximum acceptable value of the eccentricity is "Δr2". In this case, the address "X" in the L0 layer is located at a position obtained by shifting to the outer circumferential side, by "Δr2" corresponding to the amount of the eccentricity, from the position of the address "Y" in the L1 layer. Namely, a difference in the position of the addresses "X" and "Y" is the eccentric clearance.

Moreover, as shown in FIG. 9(*a*), if the laser light LB is focused on the L1 layer, a beam spot with a predetermined radius of "Δr3" is formed on the L0 layer. Now, as described above, a case where the data is recorded into the L1 layer by irradiating the L1 layer with the laser light LB through the L0 layer in which the data is recorded, is considered. As shown in FIG. 9(*a*), in the case where the data is recorded until an address "X" of the L0 layer, if the laser light LB is focused on an address "Y" of the L1 layer which faces the address "X", the L1 layer is irradiated with the left half of the laser light LB through the L0 layer in which the data is recorded, while the L1 layer is irradiated with the right half of the laser light LB through the L0 layer in which the data is unrecorded. Therefore, only by recording the data into the L1 layer which faces the L0 layer in which the data is recorded, it is impossible to preferably record the data into the L1 layer by irradiating the L1 layer with the laser light LB through the L0 layer in which the data is recorded.

Thus, as shown in FIG. 9(*b*), it is necessary to shift the focus position of the laser light LB in the case where the data is recorded into the L1 layer, to the inner circumferential side, by a distance corresponding to the radius "Δr3" of the beam spot, from the position represented by the address "Y" of the L1 layer which faces the address "X" of the L0 layer in which the data is recorded. Specifically, it is necessary to focus the laser light LB on a position represented by an address "Y-ΔX" obtained by shifting to the inner circumferential side by a variable "ΔX" of the address corresponding to the radius "Δr3" of the beam spot. This "Δr3" introduced in FIG. 9 is the "spot clearance". The maximum acceptable value of the radius "Δr3" of the beam spot is regarded as the value of the spot clearance. Here, again, if "Δr3" is the acceptable value of the beam spot radius in the L0 layer when the laser light LB is focused on the L1 layer, this "Δr3" is the spot clearance.

Therefore, the clearance in FIG. 7 corresponds to the sum of the eccentric clearance "Δr2" in FIG. 8 and the spot clearance "Δr3" in FIG. 9.

As explained above, even in the optical disc 100a having another specific area structure, even if there is a position shift in each of the L0 layer and the L1 layer, it is possible to keep the edge on the inner circumferential side of the lead-in area 102 and the edge on the outer circumferential side of the lead-out area 118 apart, at least by 0.4 mm. Thus, even if there is a position shift in each of the L0 layer and the L1 layer, it is possible to secure the preferable recording operation or reproduction operation. In other words, it is possible to provide the preferable lead-in area 102 and the preferable lead-out area 118 which can secure the preferable recording operation or reproduction operation.

In particular, it is possible to keep the edge on the outer circumferential side of the lead-in area 102 and the edge on the outer circumferential side of the lead-out area 118 apart, by a length corresponding to the "relative tolerance+clearance". In other words, it is possible to keep the edge on the inner circumferential side of the data area 105 next to the lead-in area 102 and the edge on the inner circumferential side of the data area 115 next to the lead-out area 118 apart, by a length corresponding to the "relative tolerance+clearance". Therefore, even if there is a position shift in each of the L0 layer and the L1 layer, or even if there is the eccentricity, or even if the spot radius of the laser light LB is considered, it is possible to record the data into the data area 115 of the L1 layer, by irradiating the laser light LB through the data area 105 of the L0 layer. Therefore, it is possible to comply with a general rule that the data is recorded into the data area 115 of the L1 layer by irradiating the laser light LB through the data area 105 of the L0 layer in which the data is recorded.

Incidentally, it is obvious that the another specific area structure (specifically, the structure that the edge on the inner circumferential side of the lead-in area 102 and the edge on the outer circumferential side of the lead-out area 118 are away from each other by a length corresponding to the "relative tolerance+clearance") may be adopted by the optical disc 100, which is explained with reference to FIG. 1 to FIG. 6.

Embodiment of Recording Apparatus

Next, with reference to FIG. 10 and FIG. 11, the structure and operation of a recording/reproducing apparatus 200, as being an embodiment according to the recording apparatus of the present invention, will be explained.

(1) Basic Structure

At first, with reference to FIG. 10, the basic structure of the recording/reproducing apparatus 200 will be discussed. FIG. 10 is a block diagram conceptually showing the basic structure of the recording/reproducing apparatus 200 in the embodiment. Incidentally, the recording/reproducing apparatus 200 has a function of recording the data onto the optical disc 100 and a function of reproducing the data recorded on the optical disc 100.

As shown in FIG. 10, the recording/reproducing apparatus 200 is provided with: a disc drive 300 into which the optical disc 100 is actually loaded and in which the data is recorded and reproduced; and a host computer 400, such as a personal computer, for controlling the recording and reproduction of the data with respect to the disc drive 300.

The disc drive 300 is provided with: the optical disc 100; a spindle motor 351; an optical pickup 352; a signal recording/reproducing device 353; a CPU (drive control device) 354; a memory 355; a data input/output control device 306; and a bus 357. Moreover, the host computer 400 is provided with: a CPU 359; a memory 360; an operation/display control device 307; an operation button 310; a display panel 311; and a data input/output control device 308.

The spindle motor 351 is intended to rotate and stop the optical disc 100, and operates upon accessing the optical disc. More specifically, the spindle motor 351 is constructed to rotate and stop the optical disc 100 at a predetermined speed, under spindle servo from a not-illustrated servo unit or the like.

The optical pickup 352 constitutes one specific example of the "first recording device" and the "second recording device" of the present invention and is provided with a semiconductor laser device, a lens, and the like, to perform the recording/reproduction with respect to the optical disc 100. More specifically, the optical pickup 352 irradiates the optical disc 100 with a light beam, such as a laser beam, as reading light with a first power upon reproduction, and as writing light with a second power upon recording, with it modulated.

The signal recording/reproducing device 353 controls the spindle motor 351 and the optical pickup 352, to thereby perform the recording/reproduction with respect to the optical disc 100. More specifically, the signal recording/reproducing device 353 is provided with: a laser diode (LD) driver; a head amplifier; and the like, for example. The laser diode driver (LD driver) drives a not-illustrated semiconductor laser located in the optical pickup 352. The head amplifier amplifies the output signal of the optical pickup 352, i.e. the reflective light of a light beam, and outputs the amplified signal. More specifically, the signal recording/reproducing device 353 drives the not-illustrated semiconductor laser device located in the optical pickup 352, in order to determine an optimum laser power by the recording and reproduction processes for the OPC pattern, together with a not-illustrated timing generator or the like, under the CPU 354, upon the OPC process.

The memory 355 is used in the whole data processing and the OPC process or the like on the disc drive 300, including a buffer area for the record/reproduction data, an area used as an intermediate buffer when data is converted into the data that can be used on the signal recording/reproducing device 353, and the like. Moreover, the memory 355 is provided with: a ROM area into which a program for performing an operation as a recording device, i.e. firmware, is stored; a buffer for temporary storage of the record/reproduction data; a RAM area into which a parameter required for the operation of a firmware program or the like is stored; and the like.

The CPU (drive control device) 354 is connected to the signal recording/reproducing device 353 and the memory 355 through the bus 357, and controls the entire disc drive 300 by giving an instruction to various controlling devices. Normally, software or firmware for operating the CPU 354 is stored in the memory 355.

The data input/output control device 306 controls the input/output of the data from the exterior with respect to the disc drive 300, to thereby perform storage to and export from the data buffer on the memory 355. A drive control command issued from the external host computer 400 connected to the disc drive 300 through an interface, such as a SCSI and an ATAPI, is transmitted to the CPU 354 through the data input/output control device 306. Moreover, the record/reproduction data is also transmitted to and received from the host computer 400 through the data input/output control device 306, in the same manner.

The operation/display control device 307 receives an operation instruction and performs display with respect to the host computer 400, and transmits an instruction by the operation button 310, such as an instruction to record or reproduce, to the CPU 359. The CPU 359 may transmit a control command to the disc drive 300, through the data input/output control device 308, on the basis of instruction information from the operation/display control device 307, to thereby control the entire disc drive 300. In the same manner, the CPU 359 can transmit a command for requesting the disc drive 300 to transmit an operational state to the host, with respect to the disc drive 300. By this, the operational state of the disc drive 300, such as during recording and during reproduction, can be recognized, so that the CPU 359 can output the operational state of the disc drive 300 to the display panel 310, such as a fluorescent tube and an LCD, through the operation/display control device 307.

The memory 360 is an inner storage apparatus used by the host computer 400, and is provided with: a ROM area into which a firmware program, such as a BIOS (Basic Input/Output System), is stored; a RAM area into which a parameter required for the operation of an operating system and an application program or the like is stored; and the like. Moreover, the memory 360 may be connected to a not-illustrated external storage apparatus, such as a hard disk, through the data input/output control device 308.

One specific example used by combining the disc drive 300 and the host computer 400, as explained above, is household equipment, such as recorder equipment for recording and reproducing video images. The recorder equipment records a video signal from a broadcast reception tuner and an external connection terminal, onto a disc, and outputs the video signal reproduced from the disc to external display equipment, such as a television. The operation as the recorder equipment is performed by executing a program stored in the memory 360, on the CPU 359. Moreover, in another specific example, the disc drive 300 is a disc drive (hereinafter referred to as a "drive", as occasion demands), and the host computer 400 is a personal computer and a work station. The host computer, such as the personal computer, and the drive are connected through the data input/output control devices 306 and 308, such as the SCSI and the ATAPI, and application, such as writing software, installed in the host computer 400 controls the disc drive 300.

(2) Operation Principle

Next, with reference to FIG. 11, the recording operation of the recording/reproducing apparatus 200 in the embodiment will be discussed. Here, FIG. 11 is a flowchart conceptually showing a flow of the operation (particularly, a flow of the recording operation) of the recording/reproducing apparatus 200 in the embodiment.

As shown in FIG. 11, at first, under the control of the CPU 354 or 359, which constitutes one specific example of the "controlling device" of the present invention, it is judged whether or not the NBCA 106 is provided for an optical disc targeted for the recording operation (step S101).

As a result of the judgment in the step S101, if it is judged that the NBCA 106 is provided (the step S101: Yes), then, under the control of the CPU 354 or 359, it is judged whether or not a fixed address is used as the address of the edge on the outer circumferential side of the lead-out area 118 (abbreviated as "LO" in FIG. 11) (step S102).

As a result of the judgment in the step S102, if it is judged that the fixed address is used (the step S102: Yes), "00336Fh" is assigned as the address of the edge on the outer circumferential side of the lead-out area 118 (step S103).

On the other hand, as a result of the judgment in the step S102, if it is judged that the fixed address is not used (the step S102: No), an address value calculated on the basis of the position of the edge on the outer circumferential side of the NBCA 106 is assigned as the address of the edge on the outer circumferential side of the lead-out area 118 (step S104). Specifically, an address value corresponding to the edge on the outer circumferential side of the lead-out area 118, explained by using FIG. 6, is assigned.

On the other hand, as a result of the judgment in the step S101, if it is judged that the NBCA 106 is not provided (the step S101: No), "003329h" is assigned as the address of the edge on the outer circumferential side of the lead-out area 118.

Of course, it is obvious that the address of another area or the like may be assigned in the step S102, S103, or S104. Even in that case, the address or the like is assigned so as to have the same area structure as that of the above-mentioned optical disc 100 (or 100*a*), explained with reference to FIG. 1 to FIG. 9.

Then, the data is recorded onto the optical disc whose area structure is based on the address assigned in the step S102, S103, or S104, particularly into the data areas 105 and 115 thereof (step S106). After the recording of the data into the data areas 105 and 115 is ended, a finalize process is performed (step S107). Specifically, necessary control data, management data, or dummy data (e.g. "00 h" data, etc.) or the like is recorded into the lead-in area 102, the lead-out area 118, and the middle areas 109 and 119. The end of the finalize process completes the recording operation of the data onto the optical disc 100 (or 100*a*).

As explained above, according to the recording/reproducing apparatus 200, it is possible to record the data onto an optical disc having the same area structure as that of the above-mentioned optical disc 100 (or 100*a*), explained with reference to FIG. 1 to FIG. 9. Therefore, it is possible to provide the preferable lead-in area 102 and the preferable lead-out area 118 which can secure the preferable recording operation or reproduction operation. In addition, it is obvious that it is possible to receive the various benefits of the above-mentioned optical disc 100 (or 100*a*).

In particular, in the recording/reproducing apparatus 200, it is possible to assign the address of the edge on the outer circumferential side of the lead-out are 118 or the like, depending on the presence or absence of the NBCA 106. Therefore, it is possible to perform the area assignment, in the optimum form of each optical disc which is targeted for the recording operation. By this, it is possible to provide the preferable lead-in area 102 and the preferable lead-out area 118, without wasting the recording capacity of the optical disc.

Moreover, as in the step S102 and the step S103, it is possible to assign an address value determined in advance, as the address of the edge on the outer circumferential side of the lead-out are 118 or the like. Therefore, the recording/reproducing apparatus 200 does not have to perform a predetermined operation or the like, every time the area structure is assigned. By this, there is also an advantage that it is possible to relatively reduce the processing load of the recording/reproducing apparatus 200 in the recording operation.

Moreover, in the above-mentioned embodiments, the optical disc 100 is explained as one example of the recording medium, and the recorder or player related to the optical disc 100 is explained as one example of the recording/reproducing apparatus. The present invention, however, is not limited to the optical disc and the recorder thereof, and can be applied to other various recording media, and the recorders or players thereof, which support high density recording or high transfer rate.

The present invention is not limited to the above-described embodiments, and various changes may be made, if desired, without departing from the essence or spirit of the invention which can be read from the claims and the entire specification. A recording medium, a recording apparatus and method, and a computer program for recording control, all of which involve such changes, are also intended to be within the technical scope of the present invention.

INDUSTRIAL APPLICABILITY

The recording medium, the recording apparatus and method, and the computer program according to the present invention can be applied to a high-density optical disc, such as a DVD, and further to a recording apparatus, such as a DVD recorder. Moreover, they can be applied to a recording apparatus or the like which is mounted on various computer equipment for consumer use or for commercial use, or which can be connected to various computer equipment.

The invention claimed is:

1. A recording medium comprising:
a first recording layer and a second recording layer, on each of which a track or tracks are placed spirally or concentrically, to record therein record information, wherein
the first recording layer comprises a lead-in area to record therein control information for controlling at least one of recording and reproduction of the record information,
the second recording layer comprises a lead-out area to record therein control information for controlling at least one of recording and reproduction of the record information,
a distance between an inner radius of the lead-in area and an outer radius of the lead-out area is larger than or equal to a first predetermined value,
said first recording layer comprises an identification area in which identification information for identifying said recording medium is recorded, and
the first predetermined value is a value obtained by adding a tolerance length to 0.4 mm in a radial direction of said recording medium, in which the tolerance length indicates an acceptable range of a relative position shift between an address which is defined on a predetermined position in said first recording layer and an address which is related to the predetermined position in said second recording layer,
wherein a distance between the inner radius of the lead-in area and an outer radius of the identification area is substantially equal to 186 μm, in a radial direction of said recording medium.

2. The recording medium according to claim 1, wherein the inner radius of the lead-in area and an inner radius of the lead-out area are disposed on same radius position.

3. The recording medium according to claim 2, wherein the lead-out area is larger than the lead-in area.

4. The recording medium according to claim 1, wherein the identification area is an NBCA (Narrow Burst Cutting Area).

5. The recording medium according to claim 1, wherein the record information is recorded into said first recording layer in one direction, and the record information is recorded into said second recording layer in another direction different from the one direction.

6. A recording apparatus comprising:
a first recording device for recording record information onto a recording medium comprising: a first recording layer and a second recording layer, on each of which a track or tracks are placed spirally or concentrically, to record therein the record information;
a second recording device for recording control information for controlling at least one of recording and reproduction of the record information, into each of said first recording layer and said second recording layer; and
a controlling device for controlling said second recording device to record the control information, such that a distance between an inner radius of a lead-in area in which the control information is recorded in said first recording layer and an outer radius of a lead-out area in which the control information is recorded in said second recording layer is larger than or equal to a first predetermined value, wherein
said first recording layer comprises an identification area in which identification information for identifying said recording medium is recorded, and
the first predetermined value is a value obtained by adding a tolerance length to 0.4 mm in a radial direction of said recording medium, in which the tolerance length indicates an acceptable range of a relative position shift between an address which is defined on a predetermined position in said first recording layer and an address which is related to the predetermined position in said second recording layer,
wherein a distance between the inner radius of the lead-in area and an outer radius of the identification area is substantially equal to 186 μm, in a radial direction of said recording medium.

7. The recording apparatus according to claim 6, wherein said controlling device controls said second recording device to record the control information such that the inner radius of the lead-in area and an inner radius of the lead-out area are disposed on same radius position.

8. The recording apparatus according to claim 7, wherein said controlling device controls said second recording device to record the control information such that the lead-out area is larger than the lead-in area.

9. The recording apparatus according to claim 6, wherein the identification area is an NBCA (Narrow Burst Cutting Area).

10. The recording apparatus according to claim 6, wherein the record information is recorded into said first recording layer in one direction, and the record information is recorded into said second recording layer in another direction different from the one direction.

* * * * *